US012205332B2

(12) United States Patent
Oh et al.

(10) Patent No.: US 12,205,332 B2
(45) Date of Patent: Jan. 21, 2025

(54) DEVICE AND METHOD FOR PROCESSING POINT CLOUD DATA

(71) Applicant: LG ELECTRONICS INC., Seoul (KR)

(72) Inventors: Sejin Oh, Seoul (KR); Jongseok Lee, Seoul (KR); Donggyu Sim, Seoul (KR)

(73) Assignee: LG Electronics Inc., Seoul (KR)

( * ) Notice: Subject to any disclaimer, the term of this patent is extended or adjusted under 35 U.S.C. 154(b) by 569 days.

(21) Appl. No.: 17/438,814

(22) PCT Filed: Mar. 13, 2020

(86) PCT No.: PCT/KR2020/003552
§ 371 (c)(1),
(2) Date: Sep. 13, 2021

(87) PCT Pub. No.: WO2020/189982
PCT Pub. Date: Sep. 24, 2020

(65) Prior Publication Data
US 2022/0130075 A1  Apr. 28, 2022

Related U.S. Application Data

(60) Provisional application No. 62/819,473, filed on Mar. 15, 2019.

(51) Int. Cl.
*G06T 9/00*  (2006.01)
*G06T 17/00*  (2006.01)

(52) U.S. Cl.
CPC .............. *G06T 9/001* (2013.01); *G06T 17/00* (2013.01)

(58) Field of Classification Search
CPC ......... G06T 9/001; G06T 17/00; G06T 9/007; G06T 9/00; G06T 2207/10028; G06T 9/40; G06T 17/005; G06T 7/50; G06T 7/60; G06T 15/04; H04N 19/184; H04N 19/597; H04N 19/96; H04N 19/167; H04N 19/60; H04N 19/20; H04N 19/17; H04N 19/147; H04N 19/124; H04N 19/119; H03M 7/30; H03M 7/3059; H03M 7/6035; H03M 7/6064
See application file for complete search history.

(56) References Cited

U.S. PATENT DOCUMENTS 10,262,451 B1 * 4/2019 Chou ................. G06T 15/205
12,033,363 B2 * 7/2024 Sugio ................... G06T 9/001
(Continued)

FOREIGN PATENT DOCUMENTS

WO  2019012975 A1  1/2019

OTHER PUBLICATIONS

3DG, "G-PCC codec description v2", International Organisation for Standardisation Organisation Internationale De Normalisation ISO/IEC JTC1/SC29/WG11 Coding of Moving Pictures and Audio, ISO/IEC JTC1/SC29/WG11 N18189, Jan. 2019.
(Continued)

*Primary Examiner* — Jose L Couso
(74) *Attorney, Agent, or Firm* — Bryan Cave Leighton Paisner LLP

(57) ABSTRACT

A method for processing point cloud data according to embodiments may encode and transmit point cloud data. The method for processing point cloud data according to embodiments may receive and decode the point cloud data.

11 Claims, 32 Drawing Sheets

(56) References Cited

U.S. PATENT DOCUMENTS

| | | | |
|---|---|---|---|
| 12,063,378 B2* | 8/2024 | Boyce | H04N 19/70 |
| 2015/0243035 A1* | 8/2015 | Narasimha | G06T 7/344 |
| | | | 382/154 |
| 2017/0347100 A1* | 11/2017 | Chou | H03M 7/3059 |
| 2017/0347122 A1* | 11/2017 | Chou | G06T 9/00 |
| 2018/0268570 A1* | 9/2018 | Budagavi | G06T 9/001 |
| 2019/0069000 A1 | 2/2019 | Hou et al. | |
| 2019/0080483 A1 | 3/2019 | Mammou et al. | |
| 2019/0081638 A1 | 3/2019 | Mammou et al. | |
| 2019/0087978 A1* | 3/2019 | Tourapis | G06T 9/001 |
| 2019/0087979 A1* | 3/2019 | Mammou | H04N 19/597 |
| 2020/0014953 A1* | 1/2020 | Mammou | H04N 19/17 |
| 2020/0021847 A1* | 1/2020 | Kim | H04N 19/597 |
| 2020/0104976 A1* | 4/2020 | Mammou | G06T 3/40 |
| 2020/0105024 A1* | 4/2020 | Mammou | G06T 9/001 |
| 2020/0111237 A1* | 4/2020 | Tourapis | H04N 19/597 |
| 2020/0120347 A1* | 4/2020 | Boyce | H04N 19/42 |
| 2020/0175725 A1* | 6/2020 | Mekuria | G06T 15/08 |
| 2020/0219290 A1* | 7/2020 | Tourapis | H04N 19/597 |
| 2020/0311500 A1* | 10/2020 | Chika | G06K 15/1809 |
| 2020/0313110 A1* | 10/2020 | Kim | H10K 50/166 |
| 2020/0389639 A1* | 12/2020 | Rhyu | G06T 3/00 |
| 2021/0360267 A1* | 11/2021 | Boyce | H04N 19/136 |
| 2023/0030913 A1* | 2/2023 | Mammou | G06T 3/4038 |

OTHER PUBLICATIONS

Mammou et al., International Organisation for Standaridisation Organisation Internationale de Normalisation ISO/IEC JTC1/SC29/WG11 Coding of Moving Pictures and Audio, Jan. 2019, Marrakech, MA, 3DG, G-PCC codec description v2, ISO/IEC JTC1/SC29/WG11 N18189 (39 Pages).

* cited by examiner

FIG. 6
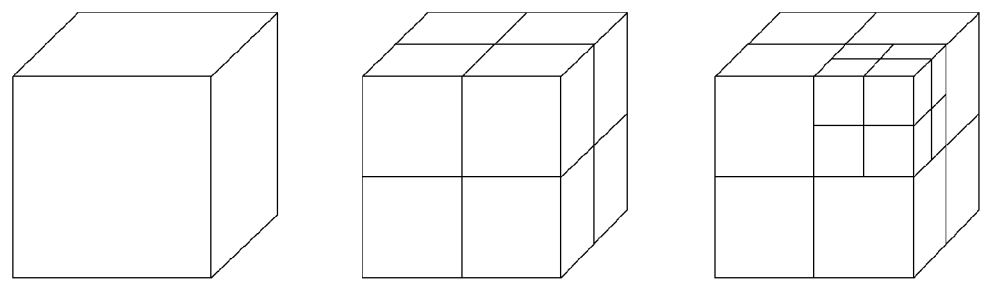
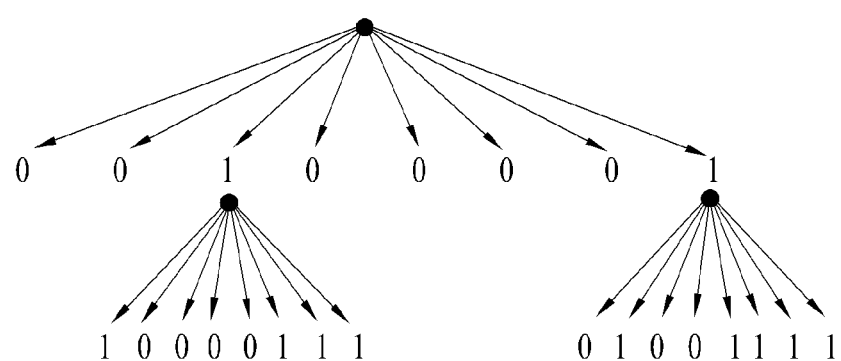

FIG. 7
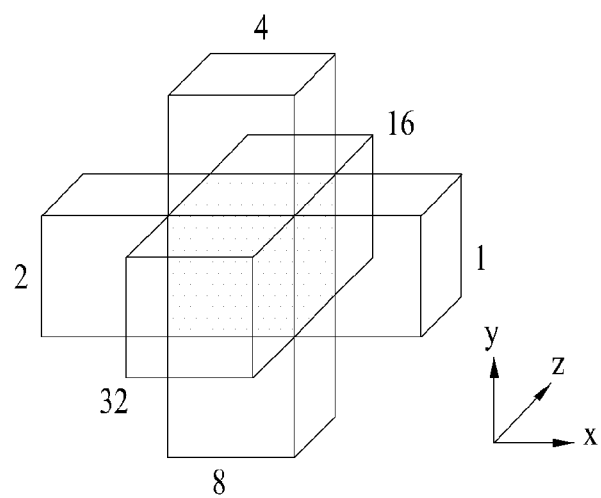
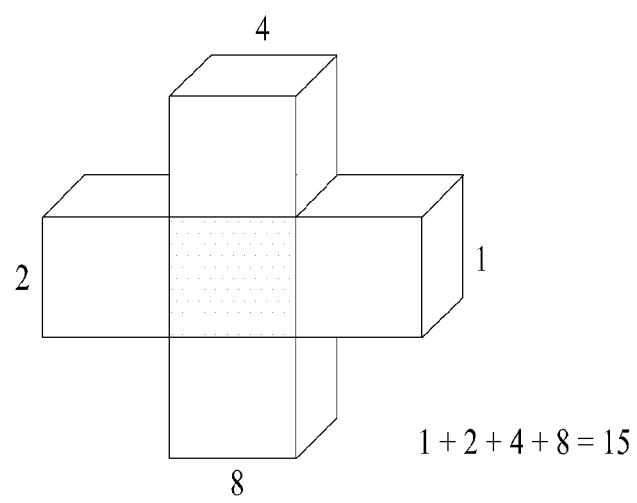
$1 + 2 + 4 + 8 = 15$

FIG. 24
(a)
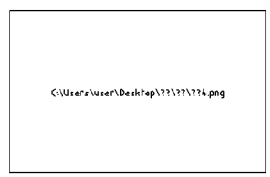
(b)
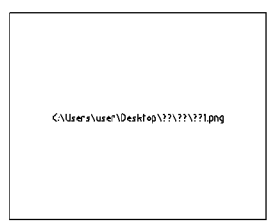
(c)
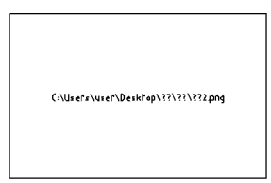
(d)

FIG. 26

| Coordinate_parameter_set( ) { | Descriptor |
|---|---|
| coordinate_parameter_set_id | |
| transform_flag | u(v) |
| if(transform_flag) { | |
|    src_coordinate_type | u(v) |
|    dest_coordinate_type | u(v) |
|    transform_type | u(v) |
|    coordinate_variable_flag | u(v) |
|    if(coordinate_variable_flag) { | |
|      coordinate_appy_unit | u(v) |
|      unit_x_offset | u(v) |
|      unit_y_offset | u(v) |
|      unit_z_offset | u(v) |
|      unit_width | u(v) |
|      unit_height | u(v) |
|      unit_depth | u(v) |
|      unit_src_coordinate_type | u(v) |

2600

| | |
|---|---|
|      unit_dest_coordinate_type | u(v) |
|      unit_coordinate_transform_type | u(v) |
|    } | |
|    } | |
| } | |

FIG. 30

$$x = r \cos \theta$$
$$y = r \sin \theta$$
$$z = z$$

(a)

$$x = \rho \sin \theta \cos \Phi$$
$$y = \rho \sin \theta \sin \Phi$$
$$z = \rho \sin \theta$$

(b)

(c)

(d)

DEVICE AND METHOD FOR PROCESSING POINT CLOUD DATA

This application is a National Stage Application of International Application No. PCT/KR2020/003552, filed on Mar. 13, 2020, which claims the benefit of and priority to U.S. Provisional Application No. 62/819,473, filed on Mar. 15, 2019, which are hereby incorporated by reference in their entirety for all purposes as if fully set forth herein.

TECHNICAL FIELD

The present disclosure provides a method for providing point cloud contents to provide a user with various services such as virtual reality (VR), augmented reality (AR), mixed reality (MR), and self-driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, in some embodiments, a method for processing point cloud data may include encoding the point cloud data including geometry information and attribute information, and transmitting a bitstream including the encoded point cloud data. In some embodiments, the geometry information represents positions of points of the point cloud data and the attribute information represents attributes of the points of the point cloud data.

In some embodiments, a method for processing point cloud data may include receiving a bitstream including the point cloud data, and decoding the point cloud data including geometry information and attribute information. The geometry information represents positions of points of the point cloud data, and the attribute information represents attributes of the points of the point cloud data.

In some embodiments, a device for processing point cloud data may include an encoder to encode point cloud data including geometry information and attribute information, and a transmitter to transmit a bitstream including the encoded point cloud data. The geometry information represents positions of points of the point cloud data, and the attribute information represents attributes of the points of the point cloud data.

In some embodiments, a device for processing point cloud data may include a receiver to receive a bitstream including point cloud data and a decoder to decode the point cloud data including geometry information and attribute information. The geometry information represents positions of points of the point cloud data, and the attribute information represents attributes of the points of the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

For a better understanding of various embodiments described below, reference should be made to the description of the following embodiments in connection with the accompanying drawings. In the drawings:

FIG. 6 shows an example of an octree and occupancy code according to embodiments;

FIG. 7 shows an example of a neighbor node pattern according to embodiments;

FIGS. 24A to 24D show embodiments of equations representing coordinate transformation;

FIG. 26 shows an example of signaling information related to coordinate transformation;

FIGS. 30A to 30D show examples of equations representing inverse coordinate transformation;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
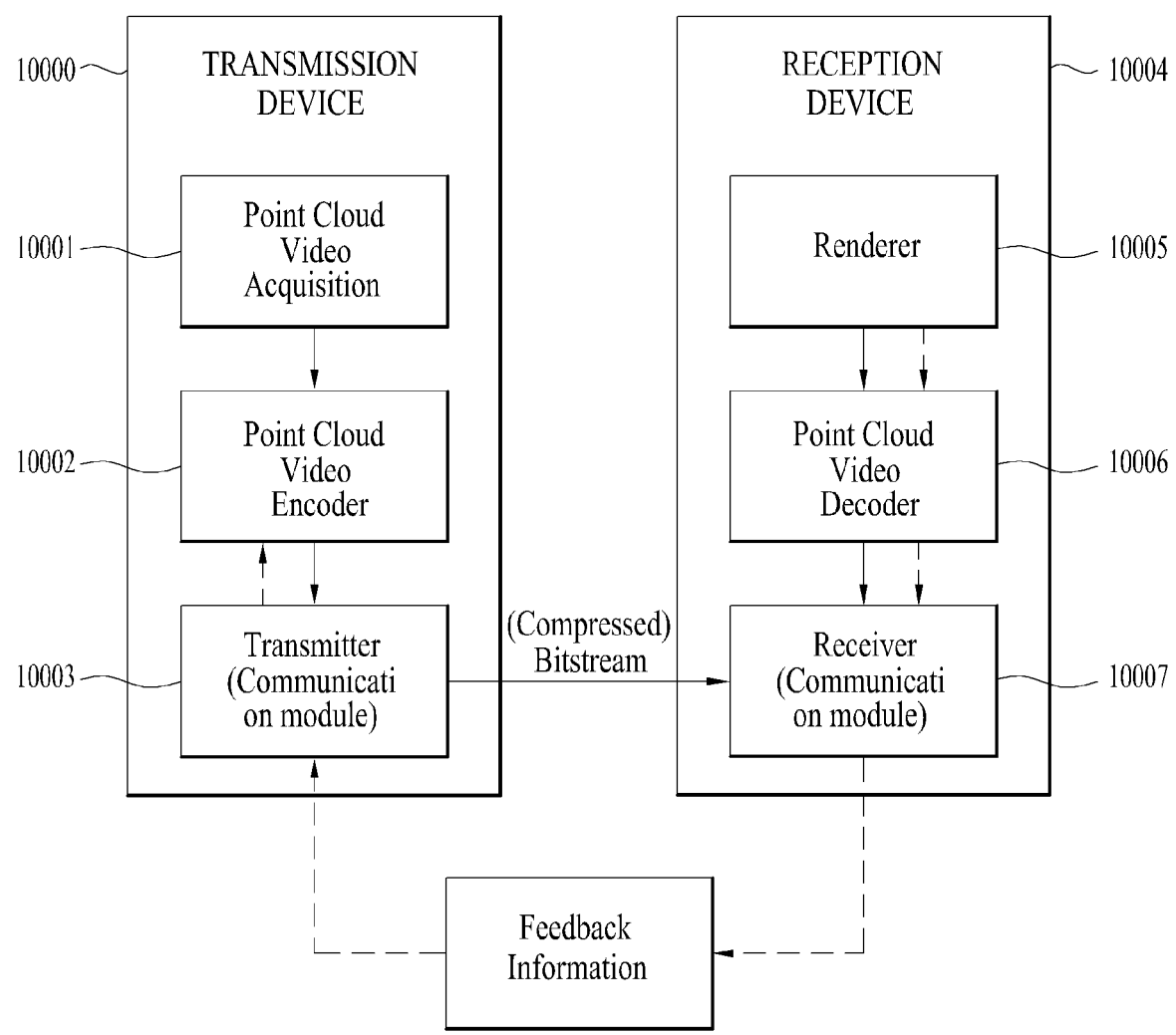
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
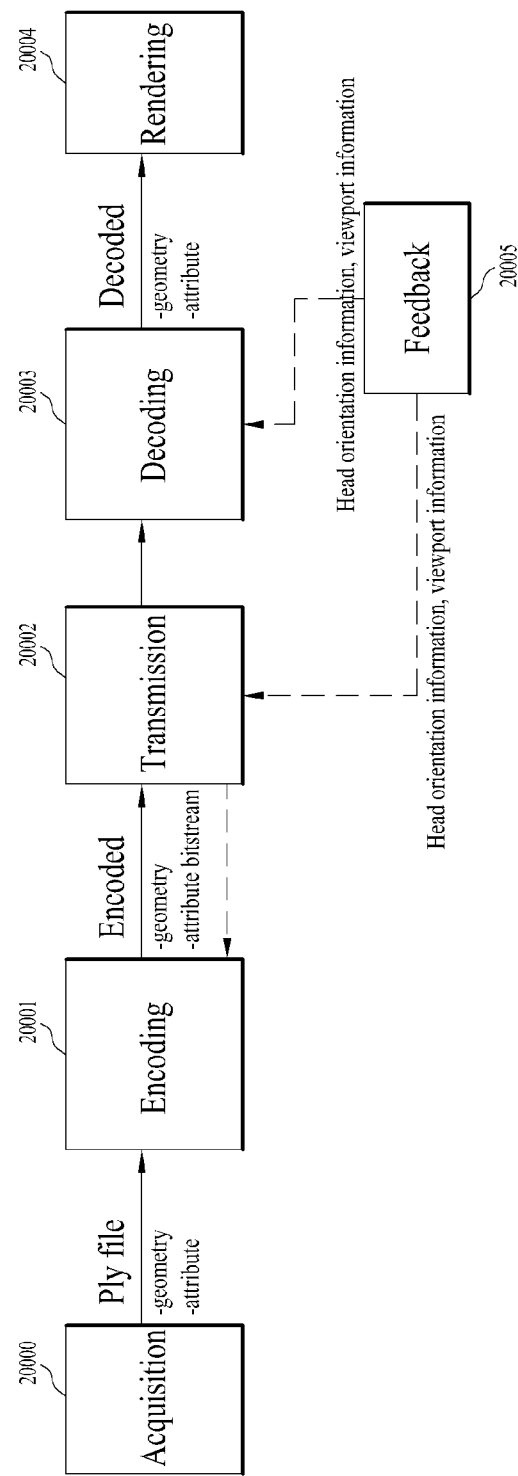
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
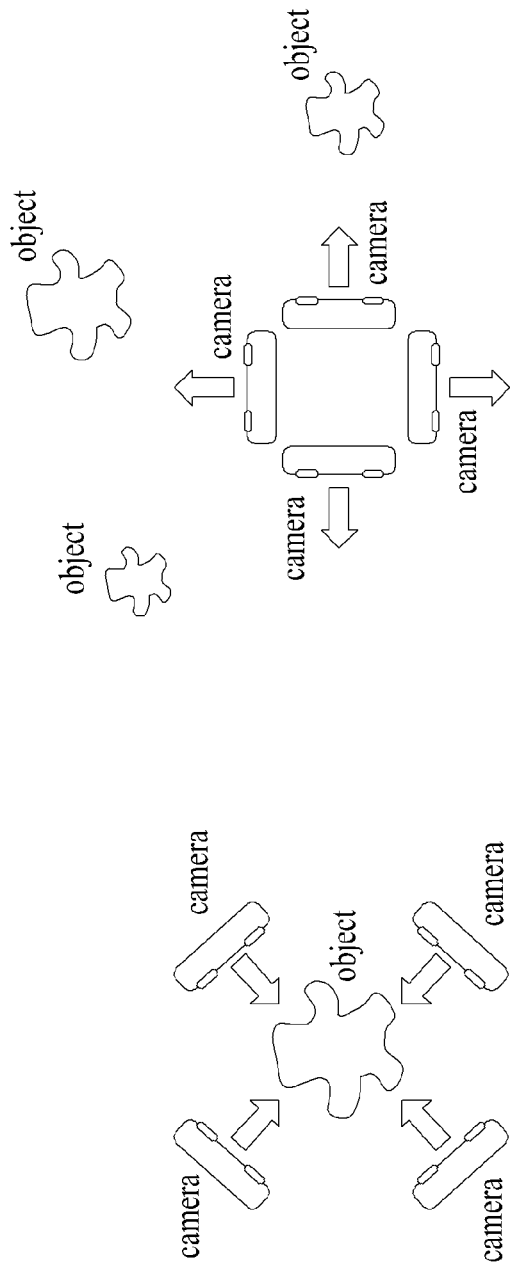
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
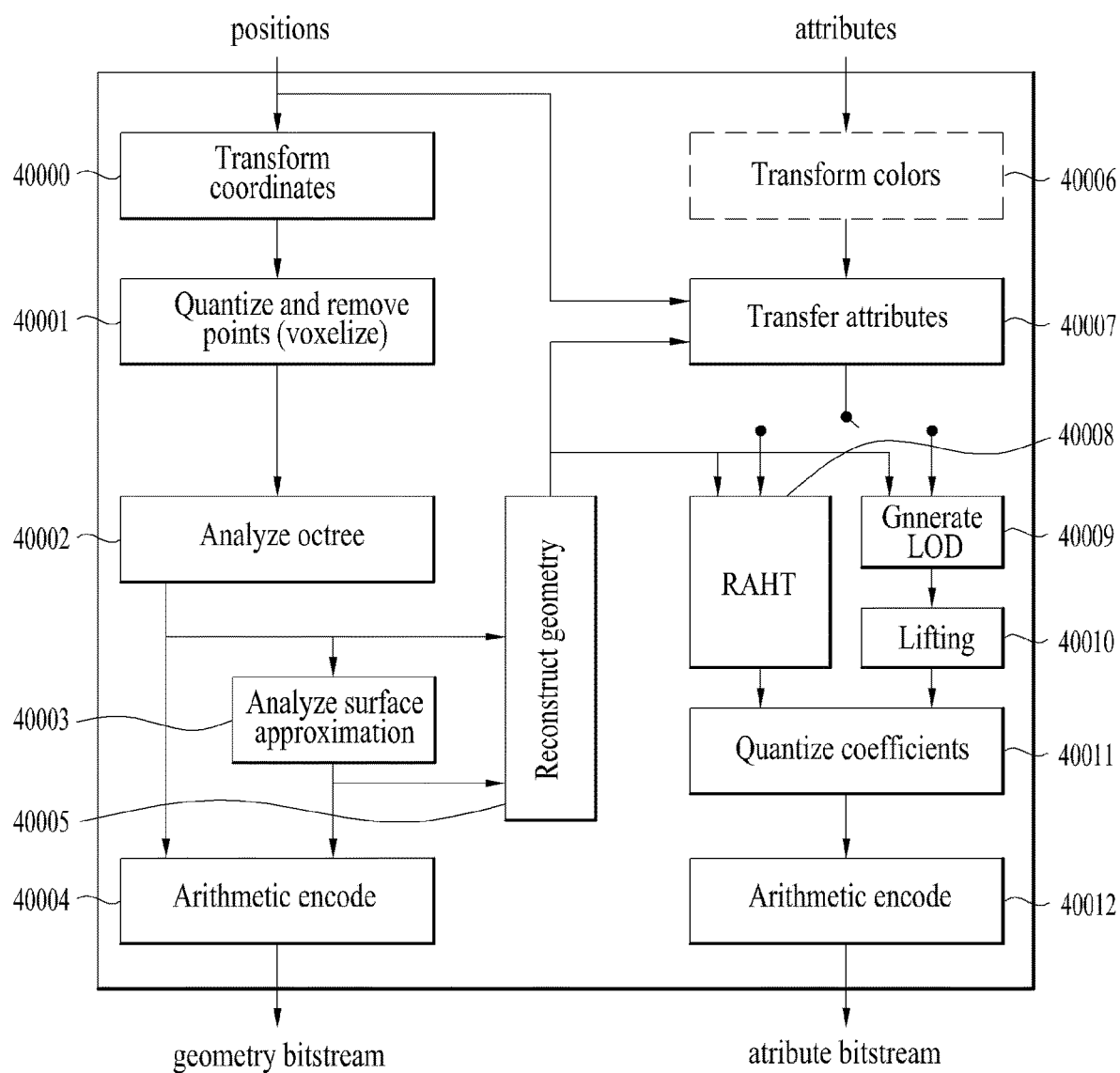
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
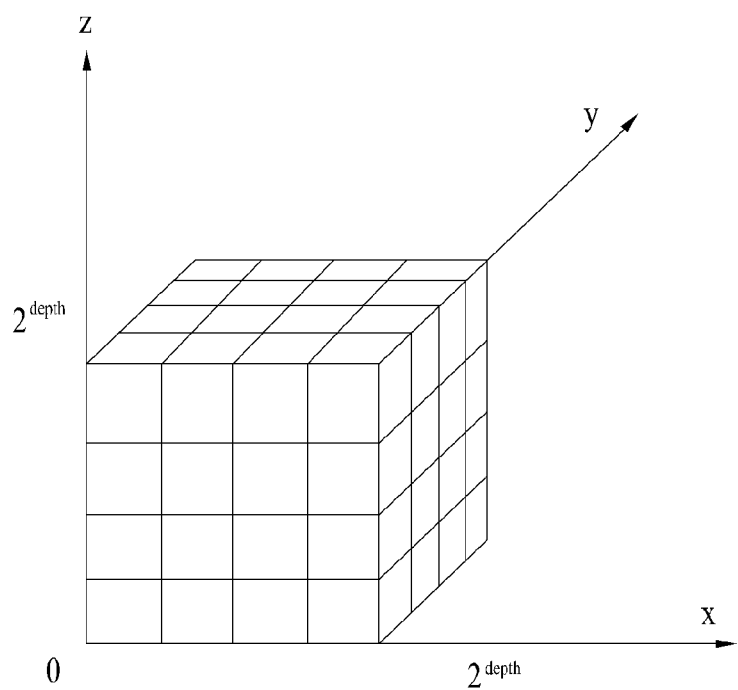
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d=\text{Ceil}(\text{Log } 2(\text{Max}(x_n^{int},y_n^{int},z_n^{int},n=1,\ldots,N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: 1) calculating the centroid value of each vertex, 2) subtracting the center value from each vertex value, and 3) estimating the sum of the squares of the values obtained by the subtraction.

1)
$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}$$

2)
$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}$$

3)
$$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through a tan 2(bi, ai), and the vertices are ordered based on the value of $\theta$. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

TABLE Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. According to the embodiments, the point cloud encoder may voxelize the refined vertices. In addition, the point cloud encoder may perform attribute encoding based on the voxelized positions (or position values). FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
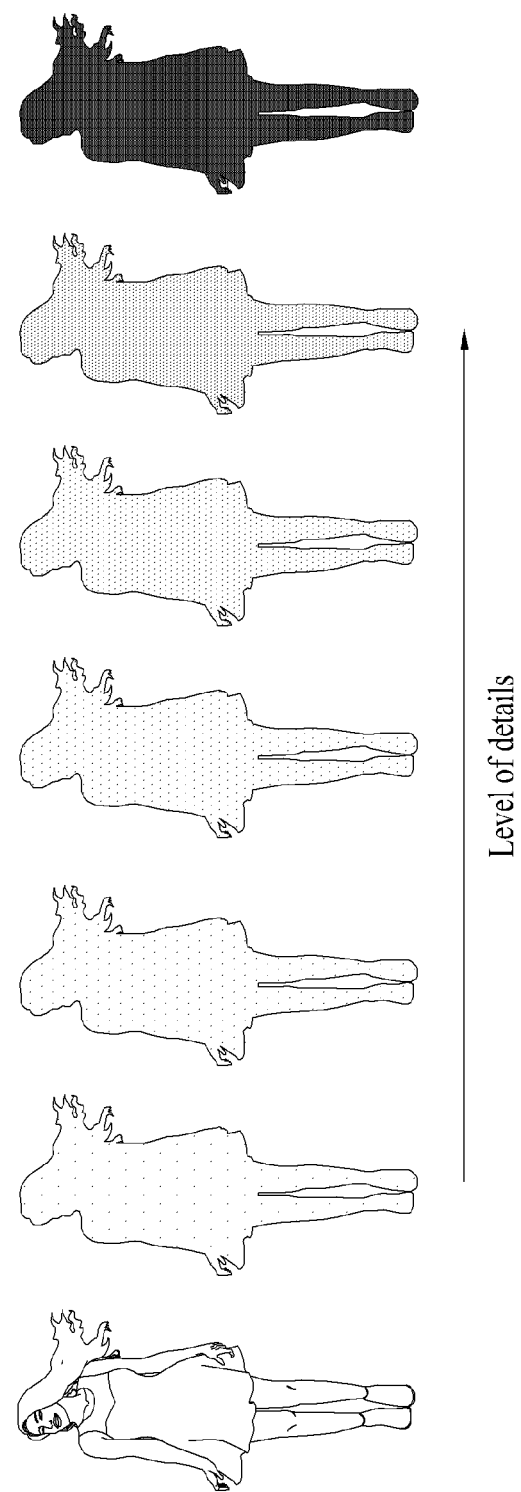
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
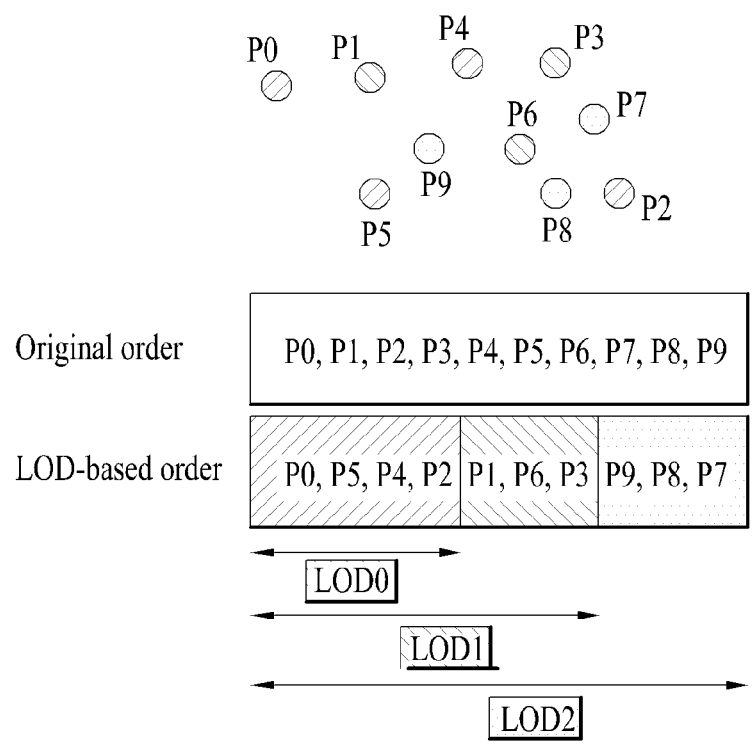
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE 2

TABLE Attribute prediction residuals quantization pseudo code

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

TABLE 3

TABLE Attribute prediction residuals inverse quantization pseudo code

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $gz_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
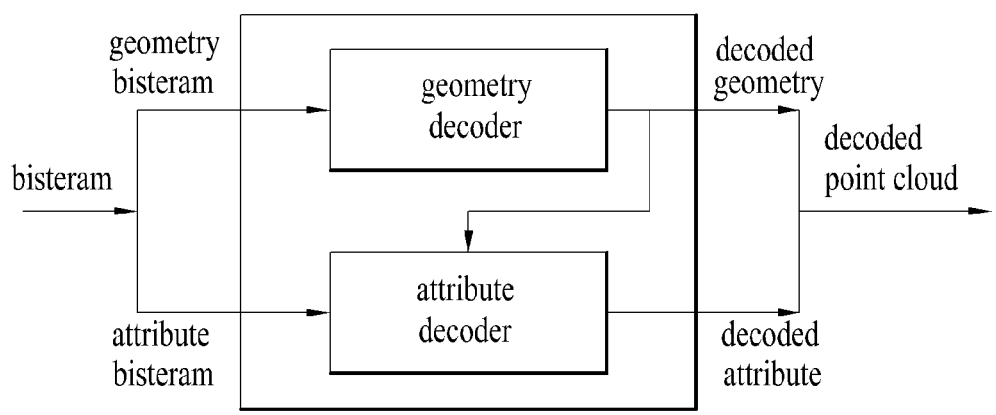
FIG. 10 illustrates an exemplary point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
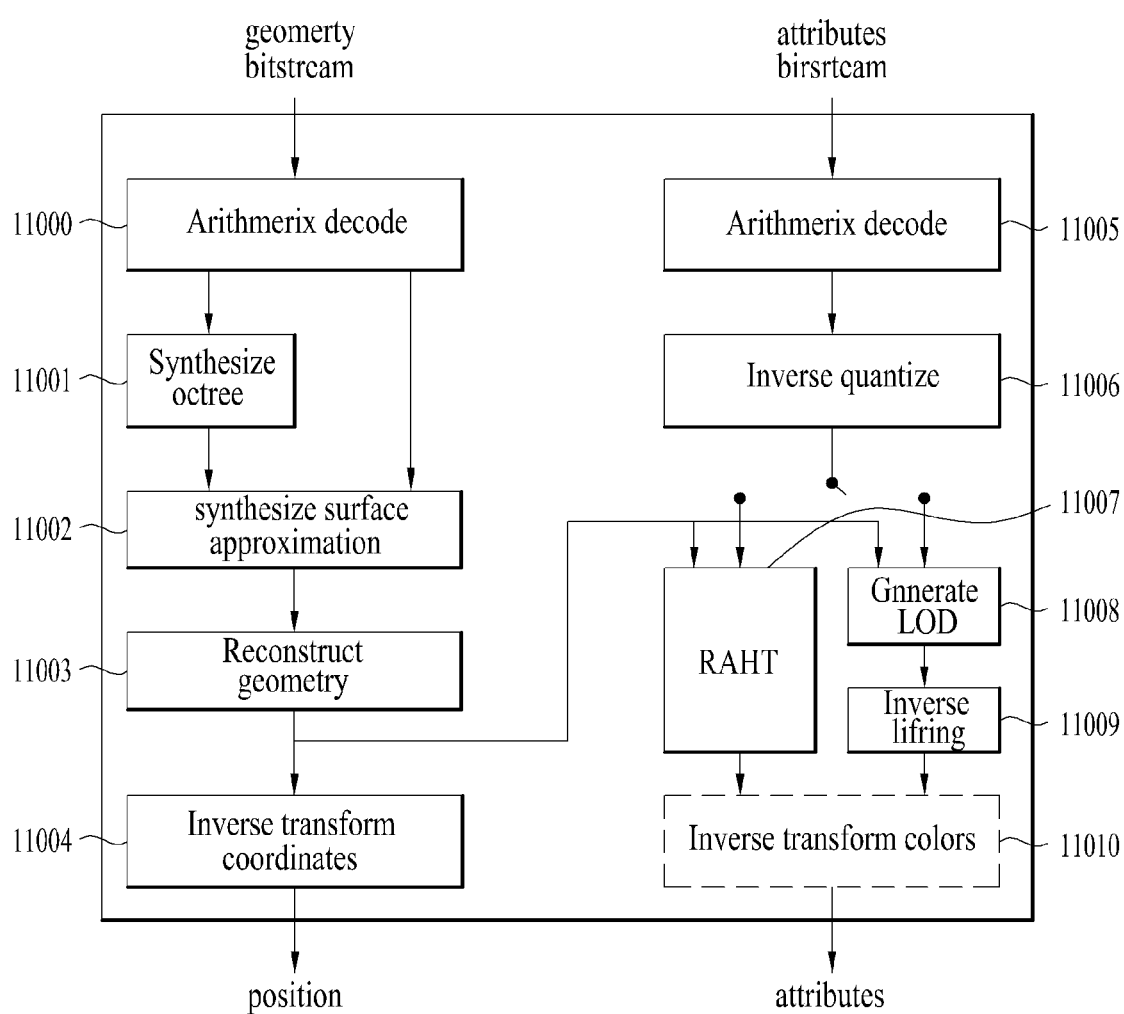
FIG. 11 illustrates an exemplary point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process of the encoding operation of the point cloud encoder described with reference to FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as the reverse of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
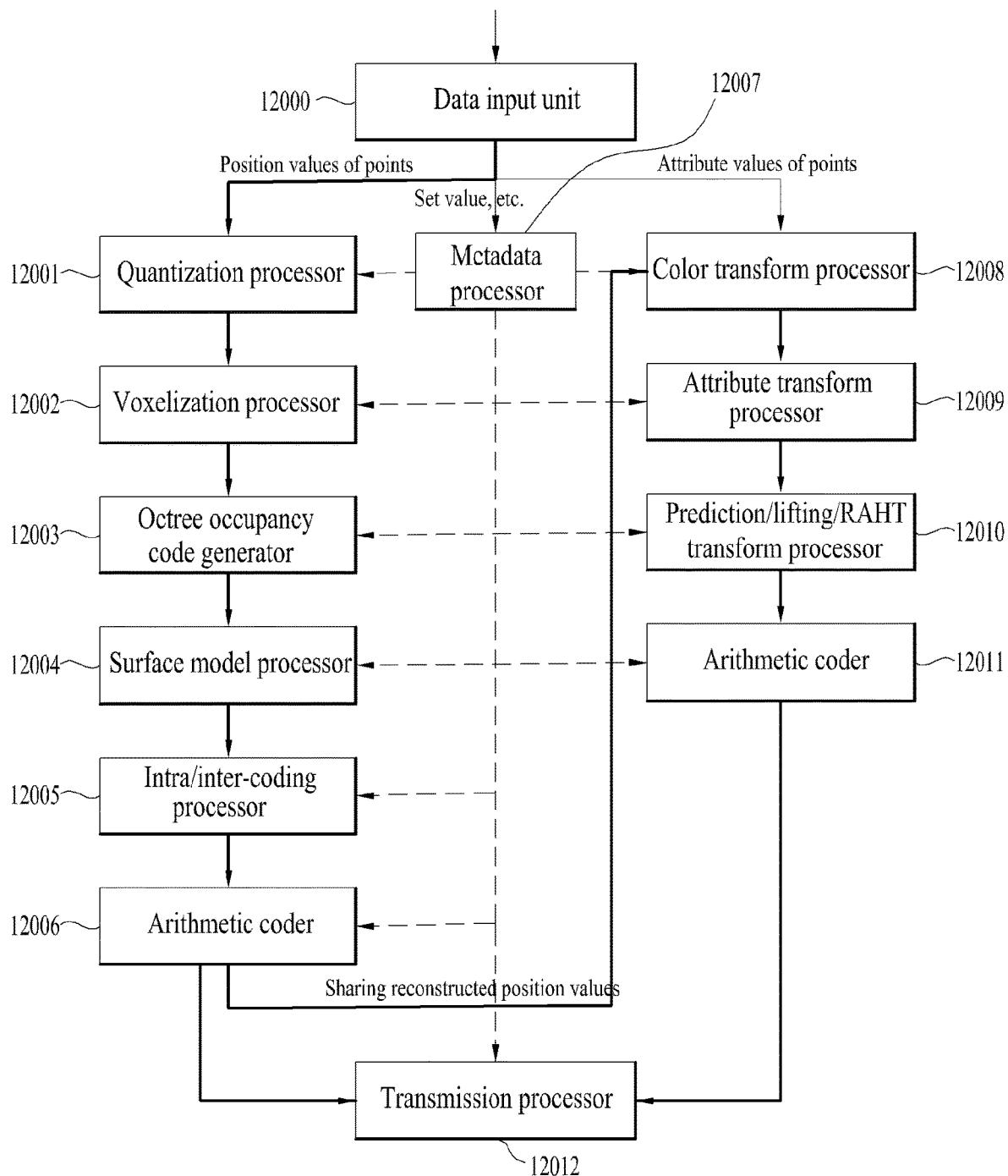
FIG. 12 illustrates an exemplary transmission device according to embodiments.

FIG. 12 illustrates an exemplary transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0⁰ and one or more attribute bitstreams Attr0⁰ and Attr1⁰. The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same or similar to the operation and/or transmission method of the transmitter 10003. Details are the same as those described with reference to FIGS. 1 and 2, and thus a description thereof is omitted.

Figure 13:
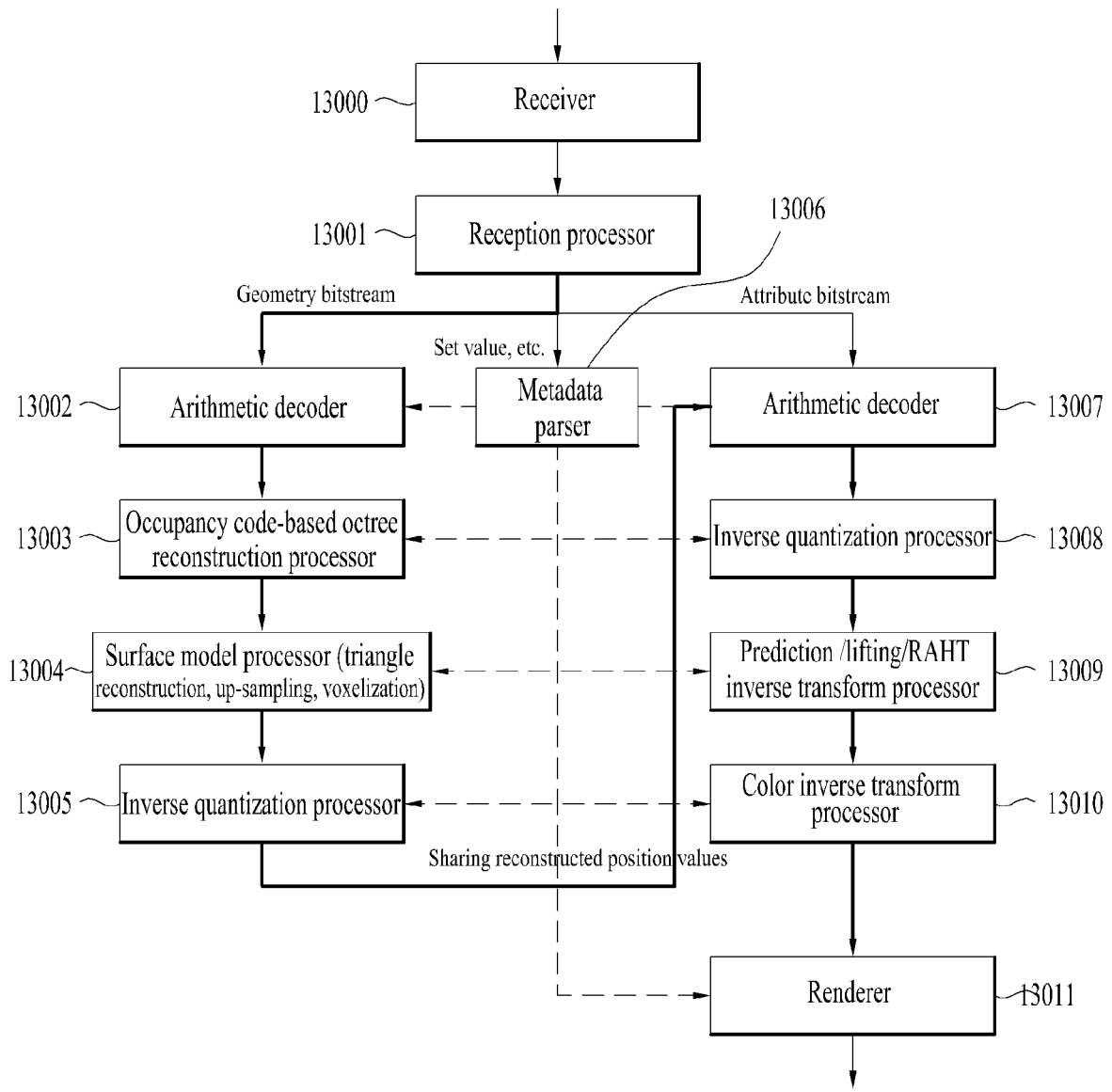
FIG. 13 illustrates an exemplary reception device according to embodiments.

FIG. 13 illustrates an exemplary reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform the reverse of the operation of a corresponding element for encoding according to the embodiments.

The receiver 13000 according to the embodiments receives point cloud data. The receiver 13000 may perform an operation and/or reception method the same or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same or similar to the operation and/or inverse transform coding of the color inverse transformer 11010. The renderer 13011 according to the embodiments may render the point cloud data.

Figure 14:
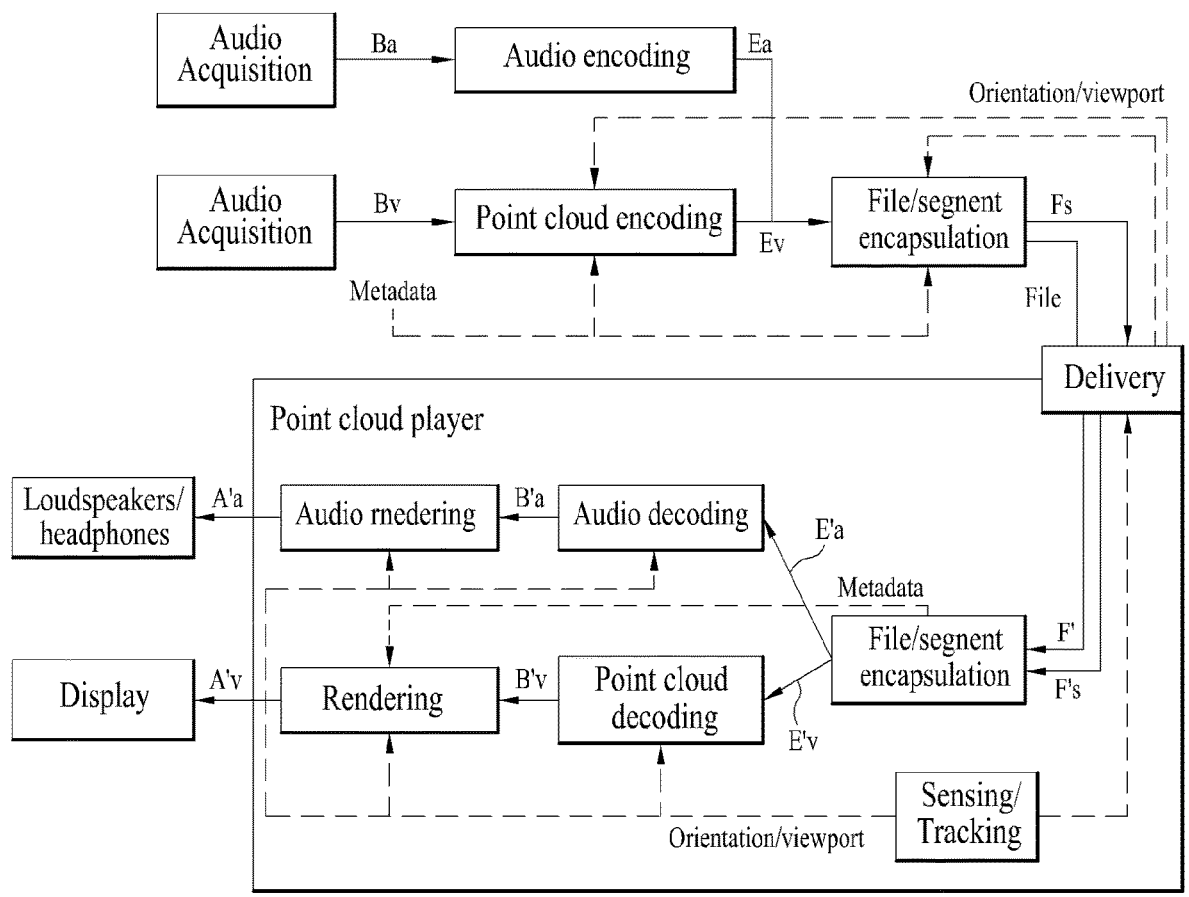
FIG. 14 illustrates an architecture for streaming G-PCC-based point cloud data according to embodiments.

FIG. 14 illustrates an architecture for streaming G-PCC-based point cloud data according to embodiments.

The upper part of FIG. 14 shows a process of processing and transmitting point cloud content by the transmission device described in FIGS. 1 to 13 (for example, the transmission device 10000, the transmission device of FIG. 12, etc.).

As described with reference to FIGS. 1 to 13, the transmission device may acquire audio Ba of the point cloud content (Audio Acquisition), encode the acquired audio (Audio Encoding), and output an audio bitstream Ea. In addition, the transmission device may acquire a point cloud (or point cloud video) By of the point cloud content (Point Acquisition), and perform point cloud encoding on the acquired point cloud to output a point cloud video bitstream Eb. The point cloud encoding of the transmission device is the same or similar to the point cloud encoding described with reference to FIGS. 1 to 13 (for example, the encoding of the point cloud encoder of FIG. 4), and thus a detailed description thereof will be omitted.

The transmission device may encapsulate the generated audio bitstream and video bitstream into a file and/or a segment (File/segment encapsulation). The encapsulated file and/or segment Fs, File may include a file in a file format such as ISOBMFF or a DASH segment. Point cloud-related metadata according to embodiments may be contained in the encapsulated file format and/or segment. The metadata may be contained in boxes of various levels on the ISOBMFF file format, or may be contained in a separate track within the file. According to an embodiment, the transmission device may encapsulate the metadata into a separate file. The transmission device according to the embodiments may deliver the encapsulated file format and/or segment over a network. The processing method for encapsulation and transmission by the transmission device is the same as that described with reference to FIGS. 1 to 13 (for example, the transmitter 10003, the transmission step 20002 of FIG. 2, etc.), and thus a detailed description thereof will be omitted.

The lower part of FIG. 14 shows a process of processing and outputting point cloud content by the reception device (for example, the reception device 10004, the reception device of FIG. 13, etc.) described with reference to FIGS. 1 to 13.

According to embodiments, the reception device may include devices configured to output final audio data and final video data (e.g., loudspeakers, headphones, a display), and a point cloud player configured to process point cloud content (a point cloud player). The final data output devices and the point cloud player may be configured as separate physical devices. The point cloud player according to the embodiments may perform geometry-based point cloud compression (G-PCC) coding, video-based point cloud compression (V-PCC) coding and/or next-generation coding.

The reception device according to the embodiments may secure a file and/or segment F', Fs' contained in the received data (for example, a broadcast signal, a signal transmitted over a network, etc.) and decapsulate the same (File/segment decapsulation). The reception and decapsulation methods of the reception device is the same as those described with reference to FIGS. 1 to 13 (for example, the receiver 10005, the reception unit 13000, the reception processing unit 13001, etc.), and thus a detailed description thereof will be omitted.

The reception device according to the embodiments secures an audio bitstream E' a and a video bitstream E'v contained in the file and/or segment. As shown in the figure, the reception device outputs decoded audio data B' a by performing audio decoding on the audio bitstream, and renders the decoded audio data (audio rendering) to output final audio data A' a through loudspeakers or headphones.

Also, the reception device performs point cloud decoding on the video bitstream E'v and outputs decoded video data B'v. The point cloud decoding according to the embodiments is the same or similar to the point cloud decoding described with reference to FIGS. 1 to 13 (for example, decoding of the point cloud decoder of FIG. 11), and thus a detailed description thereof will be omitted. The reception device may render the decoded video data and output final video data through the display.

The reception device according to the embodiments may perform at least one of decapsulation, audio decoding, audio rendering, point cloud decoding, and point cloud video rendering based on the transmitted metadata. The details of the metadata are the same as those described with reference to FIGS. 12 to 13, and thus a description thereof will be omitted.

As indicated by a dotted line shown in the figure, the reception device according to the embodiments (for example, a point cloud player or a sensing/tracking unit in the point cloud player) may generate feedback information (orientation, viewport). According to embodiments, the feedback information may be used in a decapsulation process, a point cloud decoding process and/or a rendering process of the reception device, or may be delivered to the transmission device. Details of the feedback information are the same as those described with reference to FIGS. 1 to 13, and thus a description thereof will be omitted.

Figure 15:
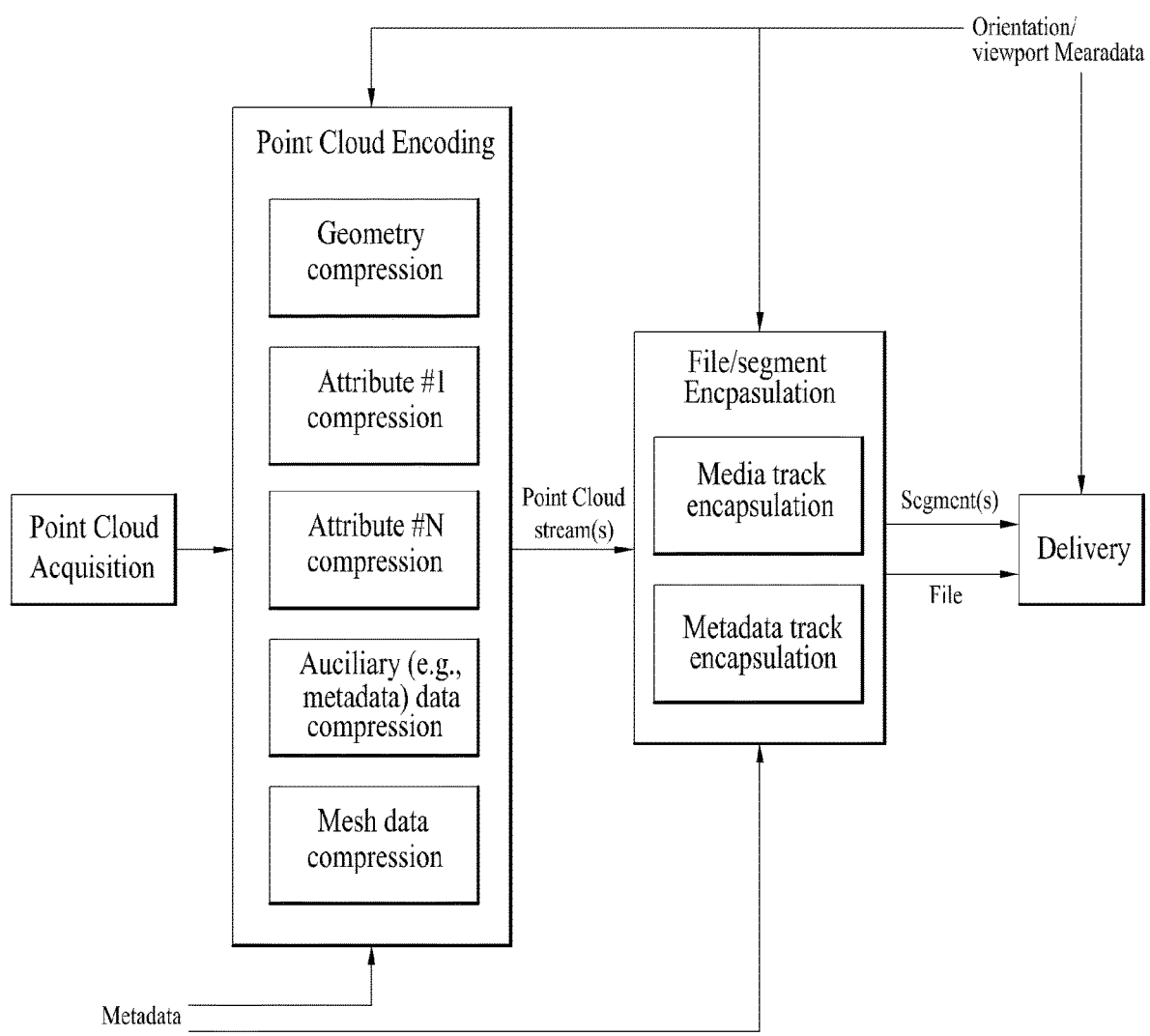
FIG. 15 illustrates an exemplary point cloud transmission device according to embodiments.

FIG. 15 shows an exemplary transmission device according to embodiments.

The transmission device of FIG. 15 is a device configured to transmit point cloud content, and corresponds to an example of the transmission device described with reference to FIGS. 1 to 14 (e.g., the transmission device 10000 of FIG. 1, the point cloud encoder of FIG. 4, the transmission device of FIG. 12, the transmission device of FIG. 14). Accordingly, the transmission device of FIG. 15 performs an operation that is identical or similar to that of the transmission device described with reference to FIGS. 1 to 14.

The transmission device according to the embodiments may perform one or more of point cloud acquisition, point cloud encoding, file/segment encapsulation and delivery.

Since the operation of point cloud acquisition and delivery illustrated in the figure is the same as the operation described with reference to FIGS. 1 to 14, a detailed description thereof will be omitted.

As described above with reference to FIGS. 1 to 14, the transmission device according to the embodiments may perform geometry encoding and attribute encoding. The geometry encoding may be referred to as geometry compression, and the attribute encoding may be referred to as attribute compression. As described above, one point may have one geometry and one or more attributes. Accordingly, the transmission device performs attribute encoding on each attribute. The figure illustrates that the transmission device performs one or more attribute compressions (attribute #1 compression, . . . , attribute #N compression). In addition, the transmission device according to the embodiments may perform auxiliary compression. The auxiliary compression is performed on the metadata. Details of the metadata are the same as those described with reference to FIGS. 1 to 14, and thus a description thereof will be omitted. The transmission device may also perform mesh data compression. The mesh data compression according to the embodiments may include the trisoup geometry encoding described with reference to FIGS. 1 to 14.

The transmission device according to the embodiments may encapsulate bitstreams (e.g., point cloud streams) output according to point cloud encoding into a file and/or a segment. According to embodiments, the transmission device may perform media track encapsulation for carrying data (for example, media data) other than the metadata, and perform metadata track encapsulation for carrying metadata. According to embodiments, the metadata may be encapsulated into a media track.

As described with reference to FIGS. 1 to 14, the transmission device may receive feedback information (orientation/viewport metadata) from the reception device, and perform at least one of the point cloud encoding, file/segment encapsulation, and delivery operations based on the received feedback information. Details are the same as those described with reference to FIGS. 1 to 14, and thus a description thereof will be omitted.

Figure 16:
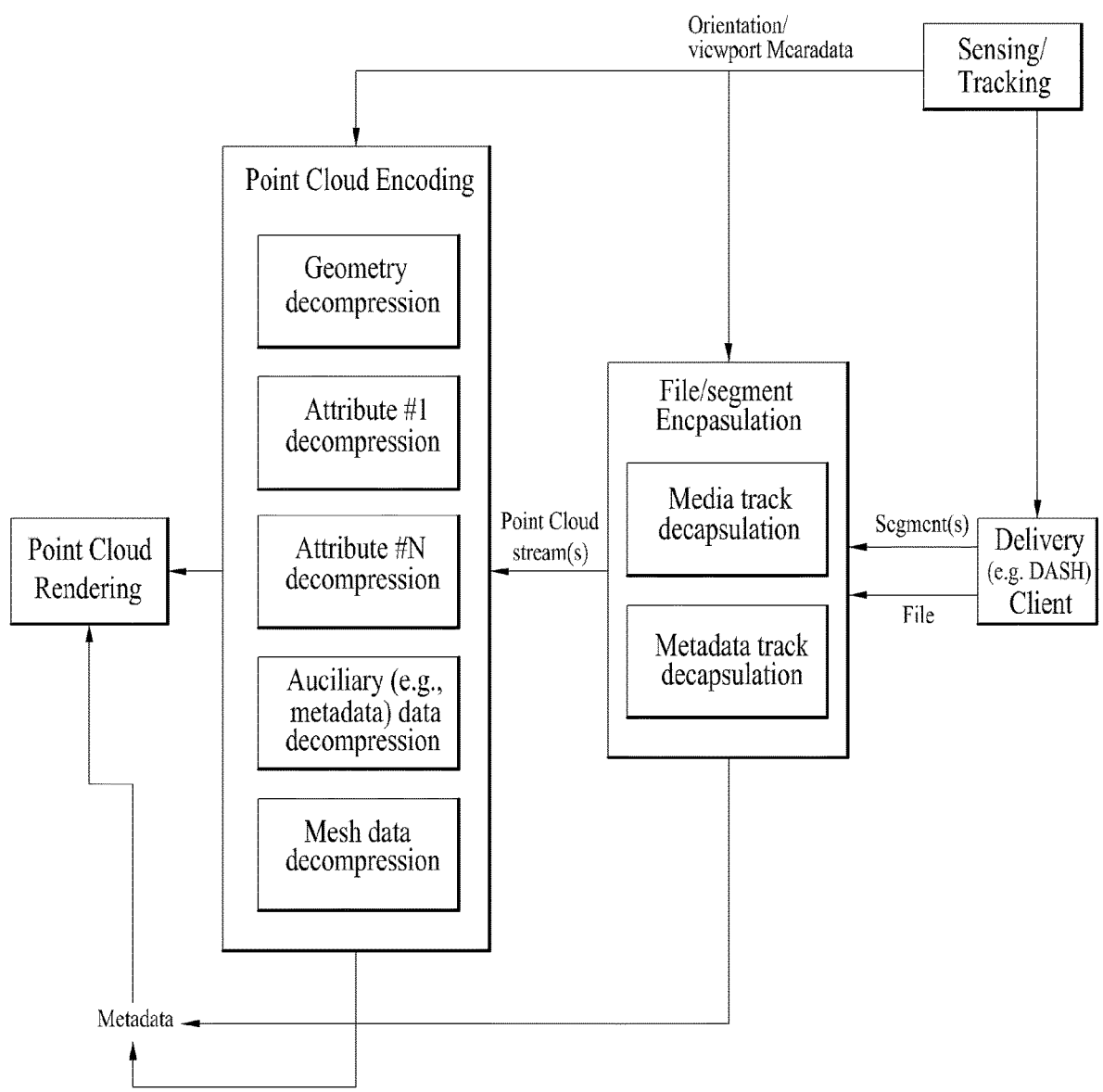
FIG. 16 illustrates an exemplary point cloud reception device according to embodiments.

FIG. 16 shows an exemplary reception device according to embodiments.

The reception device of FIG. 16 is a device for receiving point cloud content, and corresponds to an example of the reception device described with reference to FIGS. 1 to 14 (for example, the reception device 10004 of FIG. 1, the point cloud decoder of FIG. 11, and the reception device of FIG. 13, the reception device of FIG. 14). Accordingly, the reception device of FIG. 16 performs an operation that is identical or similar to that of the reception device described with reference to FIGS. 1 to 14. The reception device of FIG. 16 may receive a signal transmitted from the transmission device of FIG. 15, and perform a reverse process of the operation of the transmission device of FIG. 15.

The reception device according to the embodiments may perform at least one of delivery, file/segment decapsulation, point cloud decoding, and point cloud rendering.

Since the point cloud reception and point cloud rendering operations illustrated in the figure are the same as those described with reference to FIGS. 1 to 14, a detailed description thereof will be omitted.

As described with reference to FIGS. 1 to 14, the reception device according to the embodiments decapsulate the file and/or segment acquired from a network or a storage device. According to embodiments, the reception device may perform media track decapsulation for carrying data (for example, media data) other than the metadata, and perform metadata track decapsulation for carrying metadata. According to embodiments, in the case where the metadata is encapsulated into a media track, the metadata track decapsulation is omitted.

As described with reference to FIGS. 1 to 14, the reception device may perform geometry decoding and attribute decoding on bitstreams (e.g., point cloud streams) secured through decapsulation. The geometry decoding may be referred to as geometry decompression, and the attribute decoding may be referred to as attribute decompression. As described above, one point may have one geometry and one or more attributes, each of which is encoded by the transmission device. Accordingly, the reception device performs attribute decoding on each attribute. The figure illustrates that the reception device performs one or more attribute decompressions (attribute #1 decompression, . . . , attribute #N decompression). The reception device according to the embodiments may also perform auxiliary decompression. The auxiliary decompression is performed on the metadata. Details of the metadata are the same as those described with reference to FIGS. 1 to 14, and thus a disruption thereof will be omitted. The reception device may also perform mesh data decompression. The mesh data decompression according to the embodiments may include the trisoup geometry decoding described with reference to FIGS. 1 to 14. The reception device according to the embodiments may render the point cloud data that is output according to the point cloud decoding.

As described with reference to FIGS. 1 to 14, the reception device may secure orientation/viewport metadata using a separate sensing/tracking element, and transmit feedback information including the same to a transmission device (for example, the transmission device of FIG. 15). In addition, the reception device may perform at least one of a reception operation, file/segment decapsulation, and point cloud decoding based on the feedback information. Details are the same as those described with reference to FIGS. 1 to 14, and thus a description thereof will be omitted.

Figure 17:
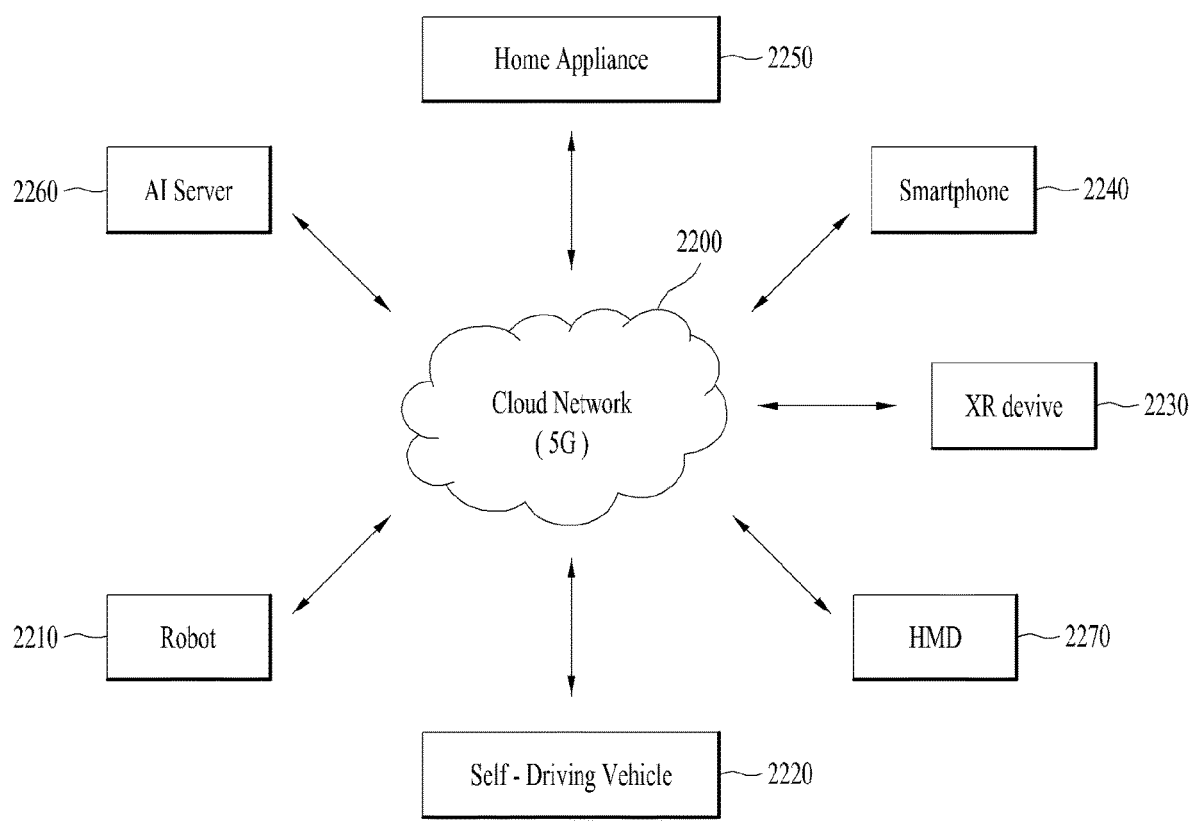
FIG. 17 illustrates an exemplary structure operatively connectable with a method/device for transmitting and receiving point cloud data according to embodiments.

FIG. 17 shows an exemplary structure operatively connectable with a method/device for transmitting and receiving point cloud data according to embodiments.

The structure of FIG. 17 represents a configuration in which at least one of a server 1760, a robot 1710, a self-driving vehicle 1720, an XR device 1730, a smartphone 1740, a home appliance 1750, and/or an HMD 1770 is connected to a cloud network 1700. The robot 1710, the self-driving vehicle 1720, the XR device 1730, the smartphone 1740, or the home appliance 1750 is referred to as a device. Further, the XR device 1730 may correspond to a point cloud data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist at least a part of the processing of the connected devices 1710 to 1770.

The HMD 1770 represents one of the implementation types of the XR device and/or the PCC device according to the embodiments. According to embodiments, an HMD type device includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission/reception device according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-Driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent an autonomous vehicle provided with means for providing an XR image, or an autonomous vehicle that is a target of control/interaction in the XR image. In particular, the self-driving vehicle 1720, which is a target of control/interaction in the XR image, may be distinguished from the XR device 1730 and may be operatively connected thereto.

The self-driving vehicle 1720 having means for providing an XR/PCC image may acquire sensor information from the sensors including a camera, and output the generated XR/PCC image based on the acquired sensor information. For example, the self-driving vehicle 1720 may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

The method/device according to the embodiments may refer to a point cloud data transmission/reception method and/or a point cloud data transmission/reception device.

According to embodiments, the geometry information may be referred to as geometry, and the attribute information may be referred to as attributes.

The encoder according to the embodiments may be referred to as a point cloud data encoder, a point cloud encoder, a point cloud encoding device, or the like. The decoder according to the embodiments may be referred to as a point cloud data decoder, a point cloud decoder, a point cloud decoding device, or the like.

A geometry bitstream of point cloud data according to embodiments may be referred to as a geometry bitstream, and an attribute bitstream of point cloud data according to embodiments may be referred to as an attribute bitstream.

Hereinafter, description will be given of embodiments of an encoding operation including a coordinate transformation operation of the geometry information performed to effectively compress the geometry information.

As described with reference to FIGS. 1 to 17, geometry information of point cloud data according to embodiments is information indicating positions (e.g., locations, etc.) of points. As described with reference to FIG. 4, the geometry information may be represented by parameters of coordinates such as three-dimensional orthogonal coordinates, cylindrical coordinates, or spherical coordinates. However, depending on the type and/or coordinate system of the point cloud data, the positions of the geometry information may be expressed as having irregular positions and distribution. For example, geometry information of LiDAR data represented as orthogonal coordinates indicates that the distance between points located far from the origin increases. As another example, geometry information represented as cylindrical coordinates may express a uniform distribution for points far from the origin, but may not express a uniform distribution for points close to the origin because the distance between the points increases. Expressing irregular positions or distributions of points may require more geometry information, resulting in lowered efficiency of geometry information coding. Accordingly, a point cloud encoder according to embodiments (e.g., the point cloud encoder described with reference to FIGS. 1, 4, 11, 14 and 15) may transform a part and/or the entirety of the coordinates of the geometry information to enhance the coding efficiency. That is, the point cloud encoder according to the embodiments may effectively present geometry information using the same data through a coordinate transformation operation. Also, a point cloud data transmission device according to embodiments (e.g., the point cloud data transmission device described with reference to FIGS. 1, 11, 14 and 15) may generate signaling information related to the coordinate transformation and transmit the same to a point cloud data reception device (e.g., the point cloud data reception device described with reference to FIGS. 1, 13, 14, and 16). A point cloud decoder according to embodiments (e.g., the point cloud decoder described with reference to FIGS. 1, 13, 14, and 16) may perform a decoding operation, which is the reverse of the encoding operation of the point cloud encoder based on the signaling information related to the coordinate transformation.

Figure 18:
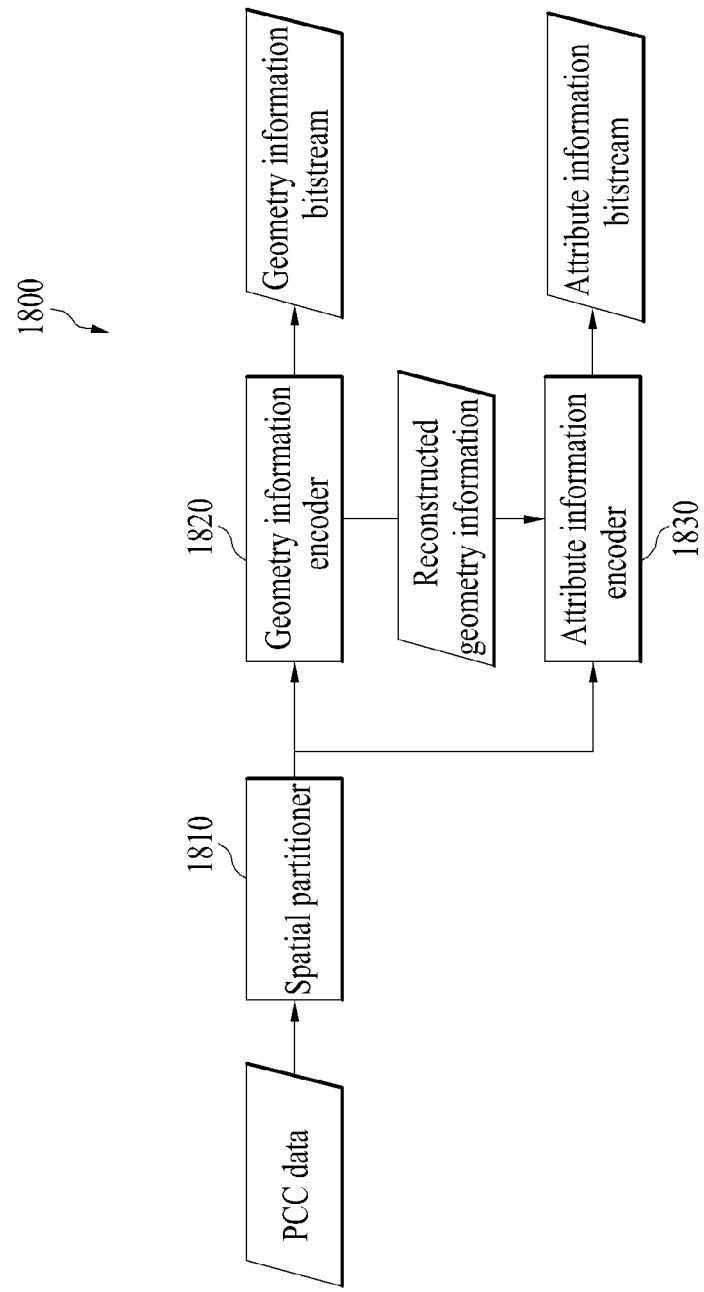
FIG. 18 is a block diagram illustrating an exemplary point cloud encoder.

FIG. 18 is a block diagram illustrating an exemplary point cloud encoder.

According to embodiments, a point cloud encoder 1800 (e.g., the point cloud encoder described with reference to FIGS. 1, 4, 11, 14, and 15) may perform the encoding operation described with reference to FIGS. 1 to 17. The point cloud encoder 1800 according to embodiments may include a spatial partitioner 1810, a geometry information encoder 1820 (a geometry encoder), and an attribute information encoder (attribute encoding unit or attribute encoder) 1830. Although not shown in FIG. 18, the point cloud encoder 1800 according to the embodiments may further include one or more elements to perform the encoding operation described with reference to FIGS. 1 to 17.

Point cloud compression (PCC) data (or PCC data or point cloud data) is input data for the point cloud encoder 1800 and may include geometry information and/or attribute information. The geometry information according to the embodiments is information indicating a position (e.g., a location) of a point, and may be represented as parameters of coordinates such as orthogonal coordinates, cylindrical coordinates, or a spherical coordinates. According to embodiments, the Attribute information, which is the attributes or attribute information described with reference to FIGS. 1 to 17, indicates an attribute of each point. The attribute information according to the embodiments may include one or more of a color (e.g., an RGB vector), a brightness value, a temperature value, and a LiDAR reflectance coefficient of a point. According to embodiments, the attribute information may be acquired by one or more sensors.

The spatial partitioner 1810 according to the embodiments may generate geometry and attributes of point cloud data. The spatial partitioner 1810 according to the embodiments may partition the PCC data into one or more 3D blocks in a 3D space in order to store point information of the PCC data. A block according to the embodiments may represent at least one of a coding unit (CU), a prediction unit (PU), or a transformation unit (TU). The spatial partitioner 1810 according to the embodiments may perform the partitioning operation based on at least one of an octree, a quadtree, a binary tree, a triple tree, or a k-d tree. A block may contain one or more points. The spatial partitioner 1810 according to the embodiments may generate geometry information about one or more points contained in the block.

The geometry information encoder (or the geometry encoder) 1820 according to the embodiments may encode the geometry information and generate a geometry bitstream and reconstructed geometry information (or reconstructed geometry). The reconstructed geometry information is input to the attribute information encoder 1830. The geometry information encoder 1820 according to the embodiments may perform the operations of the coordinate transformer (Transformation Coordinates) 40000, the quantizer (Quantize and Remove Points (Voxelize)) 40001, and the octree analyzer (Analyze Octree, 40002), the surface approximation analyzer (Analyze Surface Approximation) 40003, the arithmetic encoder (Arithmetic Encode) 40004, and the geometry reconstructor (Reconstruct Geometry) 40005 described with reference to FIG. 4. In addition, the geometry information encoder 1820 according to the embodiments may perform the operations of the data input unit 12000, the quantization processor 12001, the voxelization processor 12002, the octree occupancy code generator 12003, the surface model processor 12004, the intra/inter-coding processor 12005, the arithmetic coder 12006, the metadata processor 12007, the color transform processor 12008, the attribute transform processor 12009, the prediction/lifting/RAHT transform processor 12010, the arithmetic coder 12011 described with reference to FIG. 12. Alternatively, the geometry information encoder 1820 according to embodiments may perform the operation of point cloud encoding described with reference to FIG. 15.

The attribute information encoder 1830 according to embodiments may generate an attribute information bitstream based on the reconstructed geometry information.

The generated geometry information bitstream and attribute information bitstream may be compressed into a bitstream and transmitted to the point cloud data reception device.

The compressed bitstream may include signaling information related to the geometry information bitstream and the attribute information bitstream, and may further include signaling information related to the above-described coordinate transformation. As described with reference to FIG. 14, the compressed bitstream may be encapsulated and transmitted to the point cloud data reception device in the form of a segment or the like.

Figure 19:
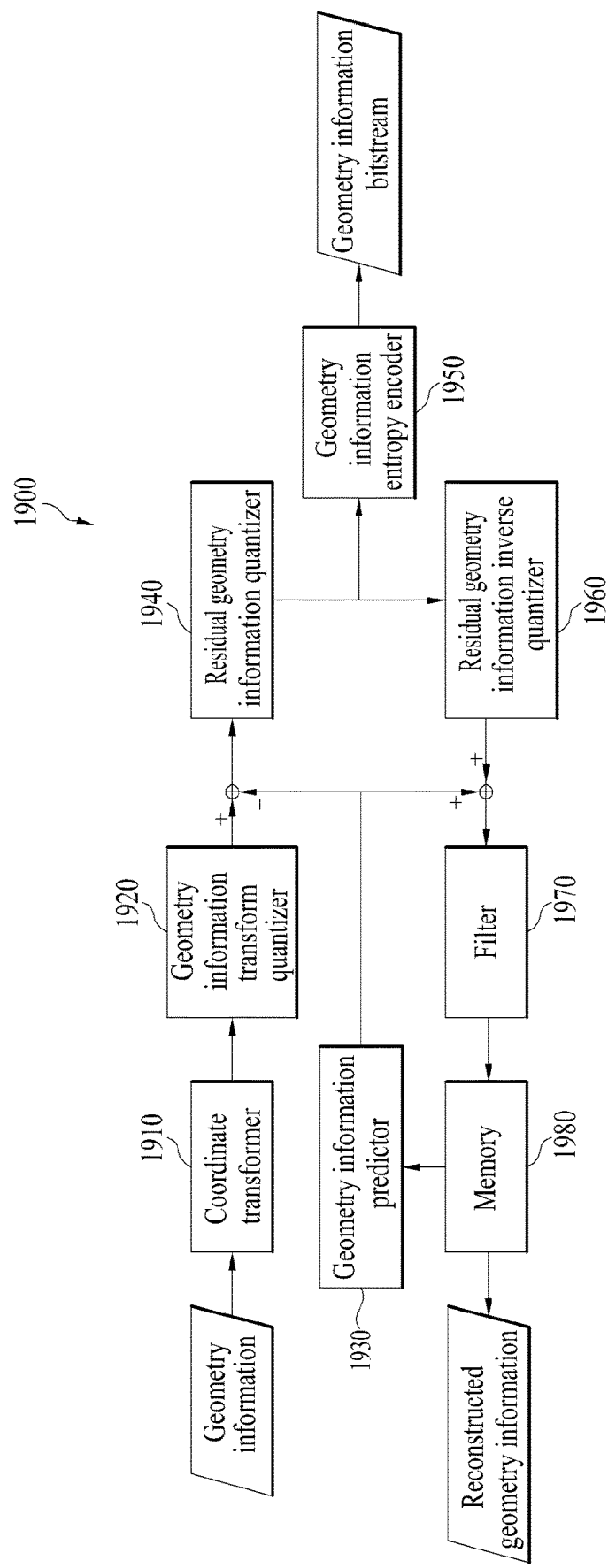
FIG. 19 is a block diagram illustrating an exemplary geometry information encoder.

FIG. 19 is a block diagram illustrating an exemplary geometry information encoder.

The geometry information encoder (or geometry encoder) 1900 according to the embodiments is an example of the geometry information encoder 1820 of FIG. 18, and may perform the operation of the geometry information encoder 1820. The geometry information encoder 1900 according to the embodiments may include a coordinate transformer 1910, a geometry information transform quantizer 1920, a residual geometry information quantizer 1930, a geometry information entropy encoder 1940, a residual geometry information inverse quantizer 1950, a filter 1960, a memory 1970, and a geometry information predictor 1980. Although not shown in FIG. 19, the geometry information encoder 1900 according to the embodiments may further include one or more elements to perform the geometry encoding operation described with reference to FIGS. 1 to 18.

The coordinate transformer 1910 according to the embodiments may transform geometry information representing position information about each point in a 3D space indicated by the input geometry information into information about a coordinate system. According to embodiments, the coordinate system may include, but is not limited to, the above-described three-dimensional orthogonal coordinate system, a cylindrical coordinate system, and a spherical coordinate system.

The geometry information transform quantizer 1920 according to the embodiments may quantize geometry information presented in a coordinate system and generate transform-quantized geometry information. The geometry information transform quantizer 1920 according to the embodiments may apply one or more transformations such as position transformation and/or rotation transformation to the positions of points indicated by the geometry information output from the coordinate transformer 1910, and perform quantization by dividing the transformed geometry information by a quantization value. The quantization value according to the embodiments may vary based on a distance between a coding unit (e.g., a tile, a slice, etc.) and an origin of the coordinate system or an angle from a reference direction. According to embodiments, the quantization value may be a preset value.

The geometry information predictor 1930 according to the embodiments may calculate a predicted value (or predicted geometry information) based on the quantization value of a neighboring coding unit.

The residual geometry information quantizer 1940 may receive the transform-quantized geometry information and residual geometry information obtained by subtracting the predicted value, and quantize the residual geometry information with the quantization value to generate quantized residual geometry information.

The geometry information entropy encoder 1950 may entropy-encode the quantized residual geometry information. The entropy encoding operation according to the embodiments may include exponential Golomb, context-adaptive variable length coding (CAVLC), and context-adaptive binary arithmetic coding (CABAC).

The residual geometry information inverse quantizer 1960 may reconstruct the residual geometry information by scaling the quantized geometry information with the quantization value. The reconstructed residual geometry information and the predicted geometry information may be summed to generate reconstructed geometry information.

The filter 1970 may filter the reconstructed geometry information. According to embodiments, the filter 1970 may include a deblocking filter and an offset corrector. The filter 1970 according to the embodiments may perform additional filtering on the boundary between two different coding units for the geometry information obtained by coordinate-transforming the two different coding units differently.

The memory 1980 may store the filtered geometry information. The stored geometry information may be provided to the geometry information predictor 1930. Also, the stored geometry information may be provided to the attribute information encoder 1830 described with reference to FIG. 18.

Figure 20:
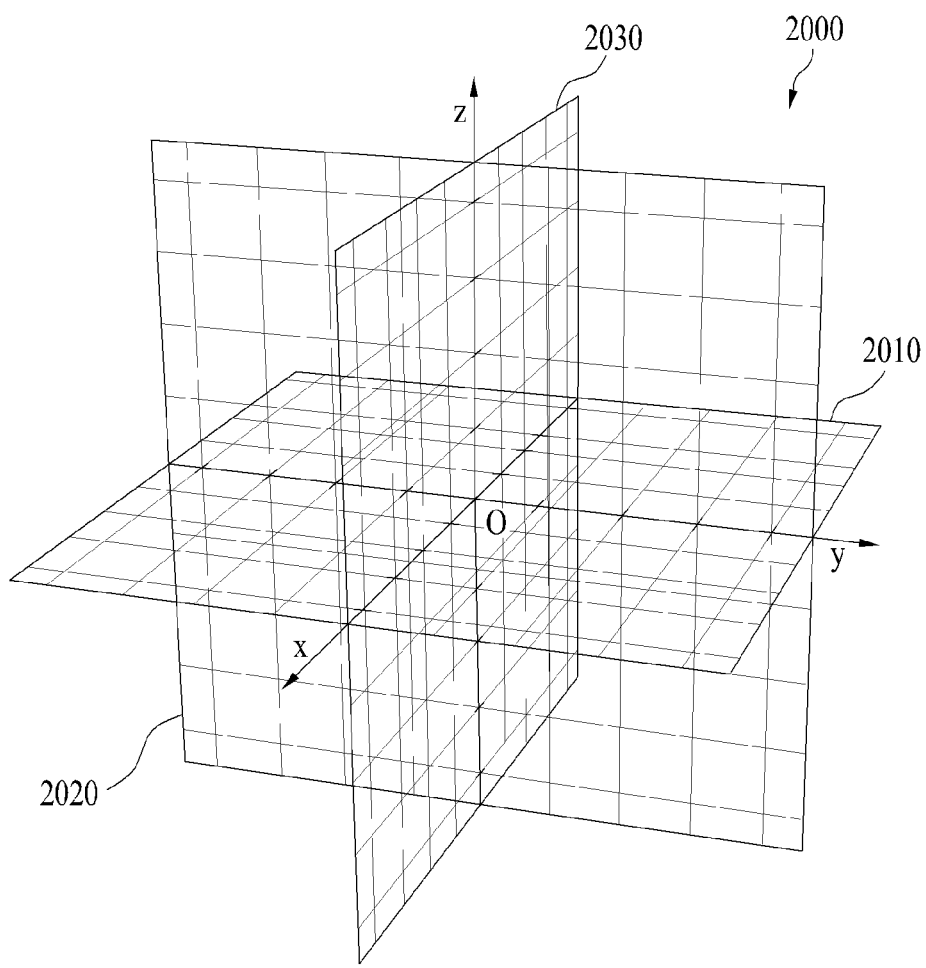
FIG. 20 shows an exemplary coordinate system of geometry information.

FIG. 20 shows an exemplary coordinate system of geometry information.

FIG. 20 shows a three-dimensional orthogonal coordinate system 2000. The three-dimensional orthogonal coordinate system 2000 according to embodiments may include an X-axis, a Y-axis, and a Z-axis that are orthogonal to each other at the origin. A point (or parameter) in the three-dimensional orthogonal coordinate system may be represented as (x, y, z). The X-Y plane 2010 formed by the X and Y axes, the Y-Z plane 2020 formed by the Y and Z axes, and the X-Z plane 2030 formed by the X and Z axes may orthogonally meet each other at the origin. The names of the X-axis, Y-axis, and Z-axis according to the embodiments are merely terms used to distinguish each axis, and may be replaced with other names.

Figure 21:
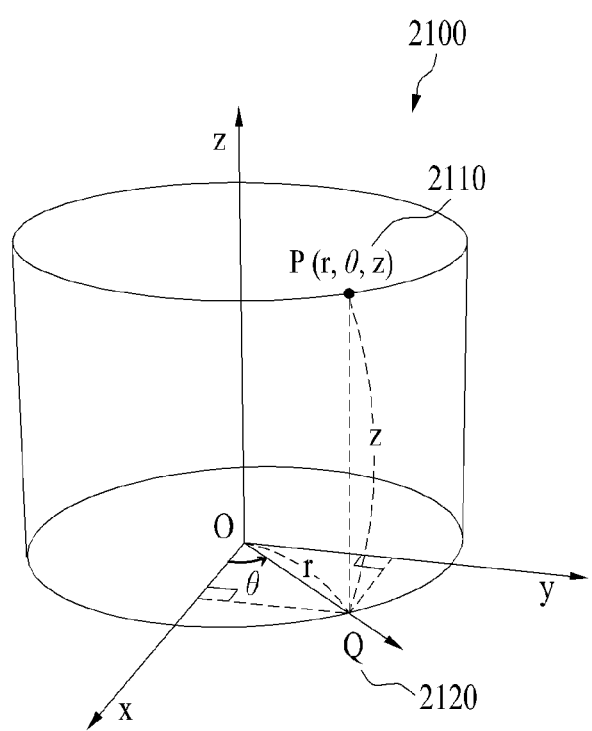
FIG. 21 shows an exemplary coordinate system of geometry information.

FIG. 21 shows an exemplary coordinate system of geometry information.

FIG. 21 shows a cylindrical coordinate system 2100. The cylindrical coordinate system 2100 according to the embodiments may include an X-axis, a Y-axis, and a Z-axis that are orthogonal to each other at the origin. Any point (or parameter) P (2110) in the cylindrical coordinate system may be represented as (r, θ, z). r denotes the distance between the origin O and point Q (2120) obtained by orthogonally projecting point P (2110) onto the X-Y plane. θ denotes the angle between the positive direction of the X-axis and the straight line OQ. z denotes the distance between point P (2110) and point Q (2120). The names of the X-axis, Y-axis, and Z-axis according to the embodiments are merely terms used to distinguish each axis, and may be replaced with other names.

Figure 22:
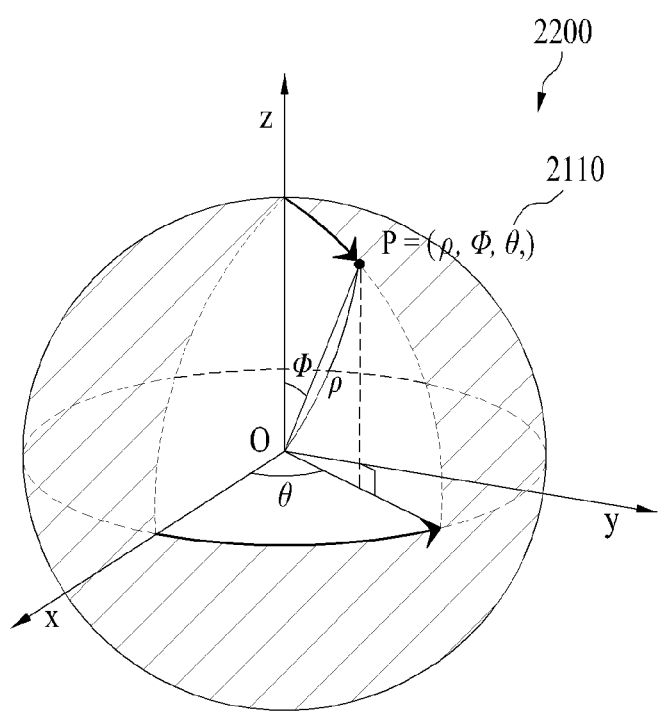
FIG. 22 shows an exemplary coordinate system of geometry information.

FIG. 22 shows an exemplary coordinate system of geometry information.

FIG. 22 shows a spherical coordinate system 2200. The spherical coordinate system 2200 according to the embodiments may include an X-axis, a Y-axis, and a Z-axis that are orthogonal to each other at the origin. Any point (or parameter) P (2210) in the spherical coordinate system may be represented as (ρ, Ø, θ). ρ denotes the distance from the origin O to point P (2210) and is greater than or equal to 0. Ø denotes the angle between the positive direction of the Z-axis and point P (2210), and has a value within a certain range (e.g., $0 \leq Ø \leq \pi$). θ denotes the angle between the positive direction of the X-axis and point Q (2220), which is obtained by orthogonally projecting point P (2210) onto the X-Y plane, and has a value within a certain range (e.g., $0 \leq \theta \leq 2\pi$). The names of the X-axis, Y-axis, and Z-axis according to the embodiments are merely terms used to distinguish each axis, and may be replaced with other names.

Figure 23:
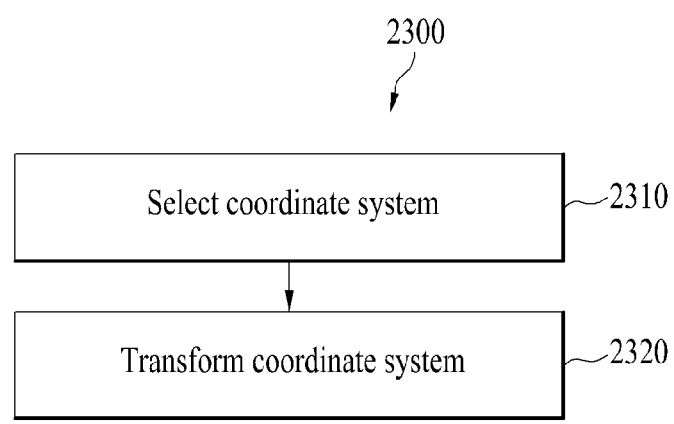
FIG. 23 is a flow diagram illustrating an operation of coordinate transformation according to embodiments.

FIG. 23 is a flow diagram illustrating an operation of coordinate transformation according to embodiments.

The coordinate transformer according to the embodiments described with reference to FIGS. 1 to 19 (e.g., the coordinate transformer 4000 described with reference to FIG. 4, the coordinate transformer 1910 described with reference to FIG. 19, etc.) may perform the coordinate transformation operation 2300 illustrated in FIG. 23.

As described above, the coordinate transformer according to the embodiments may transform the received geometry information into information in a coordinate system in order to represent the position of each point indicated by the input geometry information as a position in the 3D space. The coordinate system according to the embodiments may include, but is not limited to, an orthogonal coordinate system, a cylindrical coordinate system, and a spherical coordinate system. However, the positions of the points indicated by the geometry information may be represented as having an irregular distribution or the like depending on the type and/or coordinates of the point cloud data. For example, geometry information of LiDAR data represented as orthogonal coordinates indicates that the distance between points located far from the origin increases. As another example, geometry information represented as cylindrical coordinates may express a uniform distribution for points far from the origin, but may not express a uniform distribution for points close to the origin because the distance between the points increases. Expressing irregular positions or distributions of points may require more geometry information, resulting in lowered efficiency of geometry information coding.

Accordingly, according to embodiments, the coordinate transformer may select a coordinate system for coordinate transformation (2310). In order to transform a first coordinate system (e.g., the coordinate systems described with reference to FIGS. 20 to 22) used to represent the geometry information into a second coordinate system, one or more of the coordinate systems described with reference to FIGS. 20 to 22 may be selected. The coordinate transformer may select a coordinate system by deriving coordinate transformation information. According to embodiments, the coordinate transformation information may include whether to transform the coordinate system and/or coordinate system information. Accordingly, the coordinate transformer may determine whether to perform the coordinate transformation based on the coordinate transformation information. The coordinate transformer may derive coordinate transformation information based on whether coordinates of neighboring blocks are transformed, the size of a block, the number of points, a quantization value, block partitioning depth, the position of a unit, and the distance between the unit and the origin of the coordinate system. Also, the coordinate transformation information may include coordinate transformation information about various units such as a sequence, a frame, a tile, a slice, and a block.

According to embodiments, the coordinate transformer may transform the coordinate system (2320). The coordinate transformer may perform a coordinate transformation operation based on the coordinate transformation information to present the geometry information presented in an existing coordinate system (e.g., the first coordinate system) in the selected coordinate system (e.g., the second coordinate system). For example, the coordinate transformer may transform the existing 3D orthogonal coordinates into cylindrical coordinates (orthogonal-cylindrical coordinate transformation) or transform the existing 3D orthogonal coordinates into spherical coordinates (orthogonal-spherical coordinate transformation). Also, the coordinate transformer may transform the existing cylindrical coordinates into 3D orthogonal coordinates (cylindrical-orthogonal coordinate transformation), or transform the existing spherical coordinates into 3D orthogonal coordinates (spherical-orthogonal coordinate transformation). When the coordinate transformation operation is performed, the geometry information of the same point represented as parameters of the existing coordinate system may be represented as parameters of the changed coordinate system.

According to the embodiments, the coordinate transformer may perform a coordinate transformation operation applied to all as well as some of the geometry information of the point cloud data (e.g., LiDAR data) based on the coordinate transformation information. For example, the geometry information of LiDAR data presented in the orthogonal coordinate system may indicate that the distance between points increases as the positions of the points move away from the origin. Geometry information presented in the cylindrical coordinate system may be represented as having the same angular value even when the distance between the origin and any point (e.g., the point P (2110) in FIG. 21) in the cylindrical coordinate system increases. Accordingly, the geometry information presented in the cylindrical coordinate system may represent a uniform distribution for points far from the origin. However, the geometry information presented in the cylindrical coordinate system may not represent a uniform distribution for points close to the origin because the distance between the points increases. Therefore, for the geometry information presented in the orthogonal coordinate system (e.g., the first coordinate system), the coordinate transformer may perform orthogonal-cylindrical coordinate transformation based on the coordinate transformation information to present the geometry information about points located farther from the origin than a preset value in the cylindrical coordinate system (e.g., the second coordinate system). That is, the coordinate transformer present the geometry information about points located closer to the origin than the preset value based on the orthogonal coordinate system, and transform the geometry information about points located farther from the origin rather than the preset value from the orthogonal coordinate system to the cylindrical coordinate system. According to embodiments, the coordinate transformer may perform the coordinate transformation on a per tile or slice basis.

As described above with reference to FIGS. 1 to 19, the geometry information encoder (e.g., the geometry information encoder 1820 or the geometry information transform quantizer 1920, etc.) may divide the geometry information output from the coordinate transformer into one or more regions (spaces) in the coordinate system may quantize each region (or space) applying a different quantization step value thereto. According to embodiments, the space may be a tile. For example, the geometry information encoder may regions based on a distance from the origin, and may perform different quantization step transformation on each region. The geometry information encoder may perform quantization by applying a high quantization step (e.g., a first quantization value) to geometry information corresponding to a region whose distance from the origin is less than a preset value, and applying a low quantization step (e.g., a second quantization value) to a region whose distance from the origin is greater than the preset value.

FIGS. 24A to 24D show embodiments of equations representing coordinate transformation.

FIG. 24A shows equations representing the orthogonal-cylindrical coordinate transformation. The figure shows equations for representing geometry information presented in the orthogonal coordinate system in the cylindrical coordinate system in transforming the orthogonal coordinate system into the cylindrical coordinate system. The equations represent the relationship between the parameters of the orthogonal coordinate system described with reference to FIG. 20 and the parameters of the cylindrical coordinate system described with reference to FIG. 21. Specifically, the equations indicate that a parameter of the cylindrical coordinate system can be represented with one or more parameters of the orthogonal coordinate system (e.g., $r=\sqrt{x^2+y^2}$).

FIG. 24B shows equations representing the orthogonal-spherical coordinate transformation. The figure shows equations for representing geometry information presented in the orthogonal coordinate system in the spherical coordinate system in transforming the orthogonal coordinate system into the spherical coordinate system. The equations represent the relationship between the parameters of the orthogonal coordinate system described with reference to FIG. 20 and the parameters of the spherical coordinate system described with reference to FIG. 22. Specifically, the equations indicate that a parameter of the spherical coordinate system can be represented with one or more parameters of the orthogonal coordinate system (e.g., $\rho=\sqrt{x^2+y^2+z^2}$).

FIG. 24C shows equations representing the cylindrical-orthogonal coordinate transformation. The figure shows equations for representing geometry information presented in the cylindrical coordinate system in the orthogonal coordinate system in transforming the cylindrical coordinate system into the orthogonal coordinate system. The equations represent the relationship between the parameters of the cylindrical coordinate system described with reference to FIG. 21 and the parameters of the orthogonal coordinate system described with reference to FIG. 20. Specifically, the equations indicate that a parameter of the orthogonal coordinate system can be represented with one or more parameters of the cylindrical coordinate system (e.g., $x=r\cos\theta$).

FIG. 24D shows equations representing the spherical-orthogonal coordinate transformation. The figure shows equations for representing geometry information presented in the spherical coordinate system in the orthogonal coordinate system in transforming the spherical coordinate system into the orthogonal coordinate system. The equations represent the relationship between the parameters of the spherical coordinate system described with reference to FIG. 22 and the parameters of the orthogonal coordinate system described with reference to FIG. 20. Specifically, the equations indicate that a parameter of the orthogonal coordinate system can be represented with one or more parameters of the spherical coordinate system (e.g., $z=\rho\sin\theta$).

Figure 25:
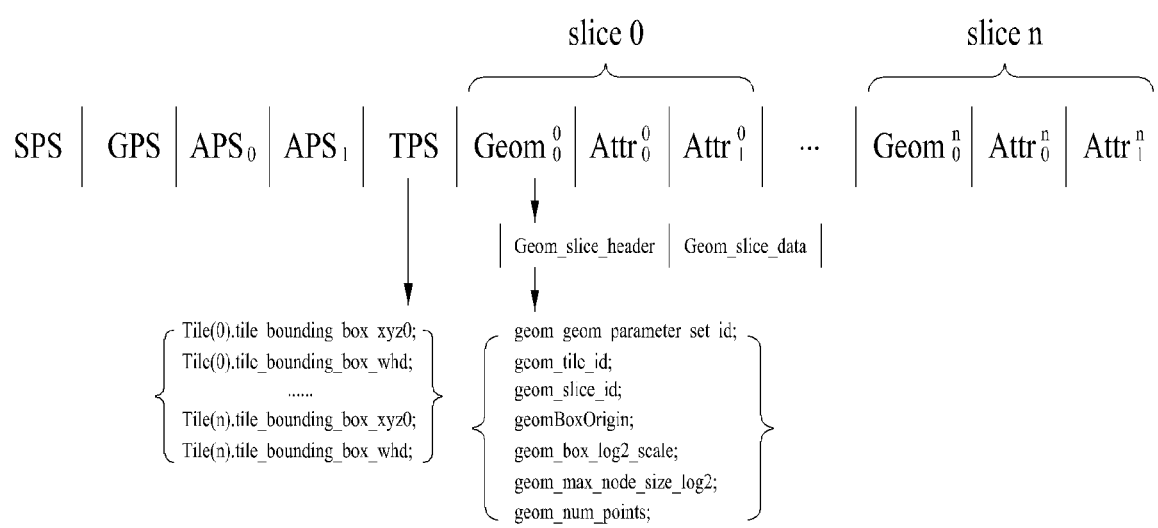
FIG. 25 shows an exemplary structural diagram of a point cloud compression (PCC) bitstream.

FIG. 25 shows an exemplary structural diagram of a point cloud compression (PCC) bitstream.

A point cloud data transmission device (e.g., the point cloud data transmission device described with reference to FIGS. 1, 11, 14 and 1) may transmit encoded point cloud data in the form of a bitstream. The bitstream shown in FIG. 25 may include one or more sub-bitstreams.

The point cloud data transmission device (e.g., the point cloud data transmission device described with reference to FIGS. 1, 11, 14 and 12) may divide an image of the point cloud data into one or more packets in consideration of the error of the transmission channel, and transmit the same over the network. According to embodiments, the bitstream 3000 may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device according to the embodiments may perform point cloud compression coding having better compression efficiency and appropriate latency on data corresponding to a region important to a user.

According to embodiments, an image (or a picture) of point cloud content may be partitioned into basic processing units for point cloud compression coding. The basic processing unit for point cloud compression coding according to the embodiments may include, but is not limited to, a coding tree unit (CTU) and a brick.

A slice according to the embodiments is a region including an integer number of one or more basic processing units for point cloud compression coding and does not have a rectangular shape. The slice according to the embodiments includes data transmitted through a packet. A tile according to the embodiments is a region partitioned in a rectangular shape in the image and includes one or more basic processing units for point cloud compression coding. According to embodiments, one slice may be included in one or more tiles. Also, according to embodiments, one tile may be included in one or more slices.

The bitstream according to the embodiments may include signaling information including a sequence parameter set (SPS) for sequence-level signaling, a geometry parameter set (GPS) for signaling of geometry information coding, an attribute parameter set (APS) for signaling of attribute information coding, and a tile parameter set (TPS) for tile-level signaling, and one or more slices.

The SPS according to the embodiments is encoding information about the entire sequence including a profile and a level, and may include comprehensive information about the entire file, such as a picture resolution and a video format.

According to embodiments, one slice (e.g., slice 0 of FIG. 25) includes a slice header and slice data. The slice data may include one geometry bitstream (Geom0⁰) and one or more attribute bitstreams (Attr0⁰, Attr1⁰). The geometry bitstream may include a header (e.g., a geometry slice header) and a payload (e.g., a geometry slice data). The header of the geometry bitstream according to the embodiments may include identification information (geom_geom_parameter_set_id) for a parameter set included in the GPS, a tile identifier (geom_tile id), a slice identifier (geom_slice_id), and information related to the data included in the payload. The attribute bitstream may include a header (e.g., an attribute slice header or an attribute brick header) and a payload (e.g., attribute slice data or attribute brick data).

As described above with reference to FIGS. 18 to 24, the point cloud decoder according to the embodiments may perform coordinate transformation or inverse transformation. Accordingly, the bitstream shown in FIG. 25 may include signaling information related to the coordinate transformation described with reference to FIGS. 18 to 24.

The signaling information included in the bitstream according to the embodiments may be generated by a metadata processor or a transmission processor (e.g., the transmission processor 12012 of FIG. 12) included in the point cloud encoder, or an element in the metadata processor or the transmission processor. According to embodiments, the signaling information may be generated based on results of geometry encoding and attribute encoding.

FIG. 26 shows an example of signaling information related to coordinate transformation.

As described above, when a point cloud data transmission device according to the embodiments (e.g., the point cloud data transmission device described with reference to FIGS. 1, 11, 14 and 1) performs a coordinate transformation operation, signaling information 2600 related to coordinate transformation may be generated and transmitted to the point cloud data reception device (e.g., the point cloud data reception device described with reference to FIGS. 1, 13, 14, and 16). A point cloud decoder according to the embodiments (e.g., the point cloud decoder described with reference to FIGS. 1, 13, 14, and 16) may perform a decoding operation, which is a reverse process of the encoding operation of the point cloud encoder, based on the signaling information 2600 related to the coordinate transformation. According to embodiments, the signaling information 2600 related to the coordinate transformation may be included in signaling information of one or more of the SPS, GPS, and APS described with reference to FIG. 25. According to embodiments, when the coordinate transformation is differently applied to each tile, the signaling information related to the coordinate transformation may be included in the TPS. According to embodiments, when the coordinate transformation is differently applied to each slice, the signaling information 2600 related to the coordinate transformation may be included in a geometry bitstream or an attribute bitstream belonging to each slice. According to embodiments, the signaling information 2600 related to the coordinate transformation may include the following parameters.

coordinate_parameter_set_id indicates an identifier of the coordinate signaling information (or parameter) set. coordinate_parameter_set_id may be used to identify a set including signaling information related to coordinate transformation.

transform_flag is information indicating whether coordinate transformation for transforming an existing coordinate system has been performed. This information may have a value of 0 when coordinate transformation is not performed, and may have a value of 1 when coordinate transformation is performed.

src_coordinate_type is information indicating the type of the existing coordinate system when coordinate transformation is performed. According to the embodiments, the existing coordinate system may correspond to one of the 3D orthogonal coordinate system, the cylindrical coordinate system, and/or the spherical coordinate system described with reference to FIGS. 20 to 22, and the type thereof is not limited to the above-described examples.

dest_coordinate_type is information for indicating the type of the destination coordinate system when coordinate transformation is performed. According to embodiments, the destination coordinate system may correspond to one of the 3D orthogonal coordinate system, the cylindrical coordinate system, and/or the spherical coordinate system described with reference to FIGS. 20 to 22, and the type thereof is not limited to the above-described examples.

transform_type is information indicating a coordinate transformation type when coordinate transformation is performed. According to embodiments, the coordinate transformation type may correspond to one of the orthogonal-cylindrical coordinate transformation, the orthogonal-spherical coordinate transformation, the cylindrical-orthogonal coordinate transformation, and the spherical-orthogonal coordinate transformation described with reference to FIGS. 24A to 24B, and the type thereof is not limited to the above-described examples.

coordinate_variable_flag is information indicating whether one or more different coordinate systems are applied in the coordinate transformation operation. This information may have a value of 0 when one or more different coordinate systems are not applied, and have a value of 1 when one or more different coordinate systems are applied.

coordinate_appy_unit information indicating a unit in which coordinate transformation is applied when one or more different coordinate systems are applied in the coordinate transformation operation. As described above, the unit in which the coordinate transformation is applied may be a slice, a tile, or the like, but is not limited to the above-described examples. According to embodiments, when the coordinate transformation is applied to a tile, the same coordinate transformation may be applied to one or more slices included in the tile. According to embodiments, coordinate transformation may be applied to each slice.

unit_xyz_offset indicates the values of x_offset, y_offset, and z_offset of a unit to which coordinate transformation is applied when one or more different coordinate systems are applied in the coordinate transformation operation.

unit_width, unit_height, and unit_depth are information indicating the width, height, and depth of a unit to which coordinate transformation is applied when one or more different coordinate systems are applied in the coordinate transformation operation.

unit_src_coordinate_type is information for indicating the type of the existing coordinate system of a unit to which the coordinate transformation is applied when one or more different coordinate systems are applied in the coordinate transformation operation. The transformed coordinate system according to the embodiments may correspond to one of the 3D orthogonal coordinate system, the cylindrical coordinate system, and/or the spherical coordinate system described with reference to FIGS. 20 to 22, and the type thereof is not limited to the above-described examples.

unit_dest_coordinate_type is information for indicating the type of the coordinate system applied to a unit to which the coordinate transformation is applied when one or more different coordinate systems are applied in the coordinate transformation operation. The transformed coordinate system according to the embodiments may correspond to one of the 3D orthogonal coordinate system, the cylindrical coordinate system, and/or the spherical coordinate system described with reference to FIGS. 20 to 22, and the type thereof is not limited to the above-described examples.

unit_coordinate_transform_type is information for indicating a coordinate transformation type applied to a unit to which coordinate transformation is applied. According to embodiments, the coordinate transformation type may correspond to one of the orthogonal-cylindrical coordinate transformation, the orthogonal-spherical coordinate transformation, the cylindrical-orthogonal coordinate transformation, and the spherical-orthogonal coordinate transformation described with reference to FIGS. 24A to 24D, and the type thereof is not limited to the above-described examples.

The signaling information 2600 related to coordinate transformation shown in FIG. 26 is merely an example. It may include some or all of the above-described parameters, and may further include additional parameters not shown in FIG. 26. Also, the names of the above-described parameters are not limited to the embodiments and may be changed.

Figure 27:
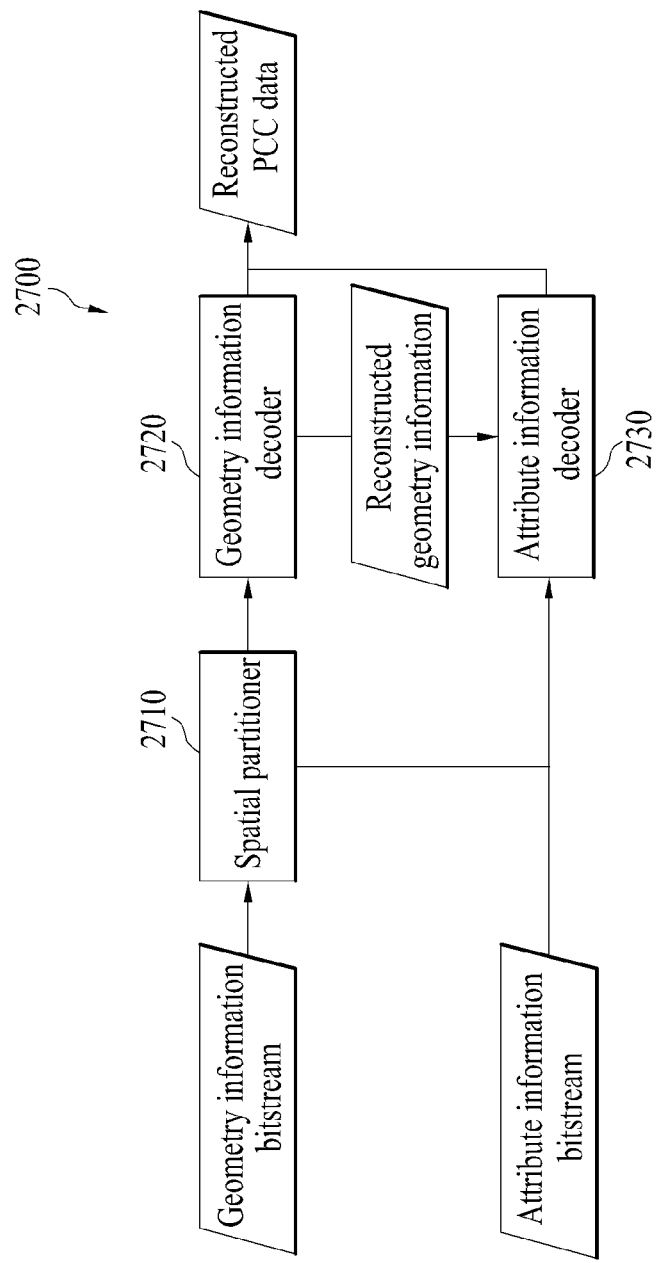
FIG. 27 is a block diagram illustrating an exemplary point cloud decoder.

FIG. 27 is a block diagram illustrating an exemplary point cloud decoder.

A point cloud decoder 2700 according to the embodiments (e.g., the point cloud decoder described with reference to FIGS. 1, 10, 11, 13, 14, and 16) may perform the decoding operation described with reference to FIGS. 1 to 17. Also, the point cloud decoder 2700 may perform a decoding operation corresponding to the reverse of the encoding operation of the point cloud encoder 1800 described with reference to FIG. 18. According to embodiments, the point cloud decoder 2700 may include a spatial partitioner 2710, a geometry information decoder (or geometry decoder) 2720, and an attribute information decoder (or attribute decoder) 2730. Although not shown in FIG. 27, the point cloud decoder 2700 according to the embodiments may further include one or more elements to perform the decoding operation described with reference to FIGS. 1 to 17.

The spatial partitioner 2710 according to the embodiments may partition the space based on the signaling information (e.g., the information on the partitioning operation performed by the spatial partitioner 1810 described with reference to FIG. 18) received from the point cloud data transmission device (e.g., the point cloud data transmission device described with reference to FIGS. 1, 11, 14 and 1) according to the embodiments, or partitioning information derived (generated) by the point cloud decoder 2700. As described above, the partitioning operation of the spatial partitioner 1810 of the point cloud encoder 1800 may be based on at least one of an octree, a quadtree, a binary tree, a triple tree, or a k-d tree.

The geometry information decoder 2720 according to the embodiments may decode the input geometry bitstream and reconstruct geometry information. The reconstructed geometry information may be input to the attribute information decoder. The geometry information decoder 2720 according to the embodiments may perform the operations of the arithmetic decoder (arithmetic decode) 11000, the octree synthesizer (Synthesize octree) 11001, and the surface approximation synthesizer (Synthesize surface approximation) 11002, the geometry reconstructor (Reconstruct geometry) 11003, and the coordinate inverse transformer (Inverse transform coordinates) 11004 described with reference to FIG. 11. Also, the geometry information decoder 2720 according to the embodiments may perform the operations of the arithmetic decoder 13002, the occupancy code-based octree reconstruction processor 13003, and the surface model processor (triangle reconstruction, up-sampling, voxelization) 13004, and the inverse quantization processor 13005 described with reference to FIG. 13. Alternatively, the geometry information decoder 2720 according to the embodiments may perform the operation of the point cloud decoding described with reference to FIG. 16.

The attribute information decoder 2730 according to the embodiments may reconstruct attribute information based on the attribute information bitstream and the received geometry information. The point cloud decoder 2700 may output final PCC data based on the reconstructed geometry information and the reconstructed attribute information.

Figure 28:
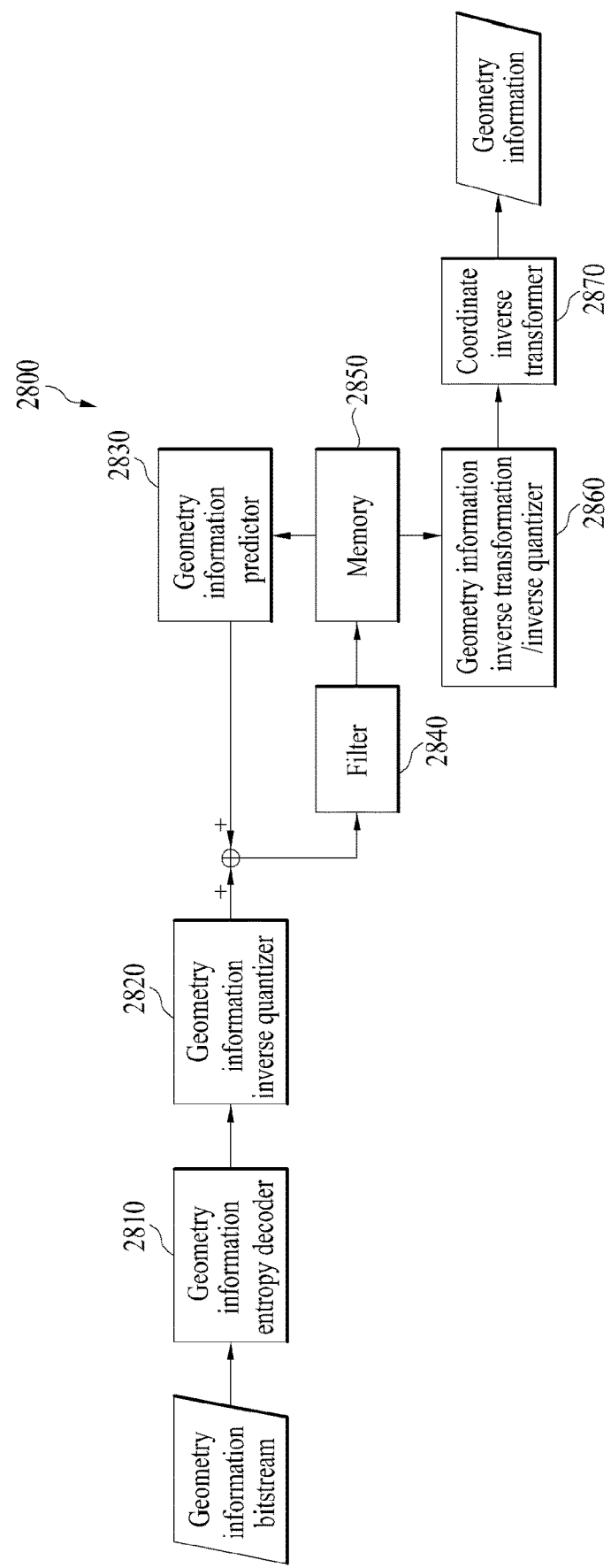
FIG. 28 is a block diagram illustrating an exemplary geometry information decoder.

FIG. 28 is a block diagram illustrating an exemplary geometry information decoder.

A geometry information decoder 2800 according to the embodiments is an example of the geometry information decoder 2720 of FIG. 27, and may perform an operation which is the same or similar to the operation of the geometry information decoder 2720. The geometry information decoder 2800 according to the embodiments may perform a decoding operation corresponding to a reverse process of the encoding operation of the geometry information encoder 1900 described with reference to FIG. 19. The geometry information decoder 2800 according to the embodiments may include a geometry information entropy decoder 2810, a geometry information inverse quantizer 2820, a geometry information predictor 2830, a filter 2840, a memory 2850, a geometry information inverse transformation/inverse quantizer 2860, and a coordinate inverse transformer 2870. Although not shown in FIG. 28, the geometry information decoder 2800 according to the embodiments may further include one or more elements to perform the geometry decoding operation described with reference to FIGS. 1 to 27.

The geometry information entropy decoder 2810 according to the embodiments may generate quantized residual geometry information by entropy-decoding the geometry information bitstream. The geometry information entropy decoder 2810 may perform an entropy decoding operation that is a reverse process of the entropy encoding performed by the geometry information entropy encoder 1905 described with reference to FIG. 19. As described above, the entropy encoding operation according to the embodiments may include exponential Golomb, CAVLC and CABAC, and the entropy decoding operation exponential Golomb, CAVLC, and CABAC corresponding to the entropy encoding operation. The geometry information entropy decoder 2810 according to the embodiments may decode information related to geometry coding included in the geometry information bitstream, for example, information related to generation of predicted geometry information, information related to quantization (e.g., quantization values, etc.), signaling information related to coordinate transformation, and the like.

The residual geometry information inverse quantizer 2820 according to the embodiments may generate residual geometry information or geometry information by performing an inverse quantization operation on the quantized residual geometry information based on quantization-related information.

The geometry information predictor 2830 according to the embodiments may generate predicted geometry information based on information related to generation of predicted geometry information output from the geometry entropy decoder 2810 and previously decoded geometry information stored in the memory 2850. The geometry information predictor 2830 according to the embodiments may include an inter-predictor and an intra-predictor. The inter-predictor according to the embodiments may perform inter-prediction on the current prediction unit based on information included in at least one of a space before or after the current space (e.g., a frame, a picture, etc.) in a current space including the current prediction unit based on information necessary for inter-prediction of the current prediction unit (e.g., node, etc.) provided by the geometry information encoder 1900. The intra-predictor according to the embodiments may generate predicted geometry information based on geometry information about a point in the current space based on information related to intra-prediction in a prediction unit provided by the geometry information encoder 1900.

The filter 2840 according to the embodiments may filter the reconstructed geometry information generated by combining the predicted geometry information, which is generated based on the filtering-related information, and the reconstructed residual geometry information. The filtering-related information according to the embodiments may be signaled from the geometry information encoder 1900, or the geometry information decoder 2800 may derive and calculate the same in the decoding operation.

The memory 2850 according to the embodiments may store the reconstructed geometry information. The geometry inverse transformation quantizer 2860 according to the embodiments may inversely transform-quantize the reconstructed geometry information stored in the memory 2850 based on quantization-related information.

The coordinate system inverse transformer 2870 according to the embodiments may inversely transform the coordinates of the inversely transform-quantized geometry information the signaling information related to the coordinate transformation described with reference to FIG. 26, and output the geometry information.

Figure 29:
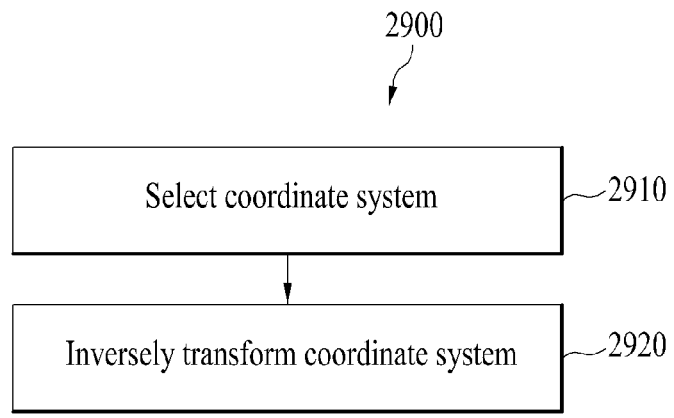
FIG. 29 is a flow diagram illustrating an operation of inverse coordinate transformation according to embodiments.

FIG. 29 is a flow diagram illustrating an operation of inverse coordinate transformation according to embodiments.

The coordinate inverse transformer according to the embodiments described with reference to FIGS. 27 and 28 (e.g., the coordinate system inverse transformer 2870 described in FIG. 28) may perform a coordinate inverse transformation operation 2900 illustrated in FIG. 29.

The coordinate inverse transformer according to embodiments may select a coordinate system for coordinate inverse transformation (2910). The coordinate inverse transformer may select the coordinate system based on signaling information related to the coordinate transformation described with reference to FIG. 26. According to embodiments, the signaling information related to the coordinate transformation may be transmitted to the point cloud data reception device through the bitstream of point cloud data described with reference to FIG. 25. Also, the coordinate inverse transformer may select a coordinate system based on preset coordinate system information.

According to embodiments, the coordinate inverse transformer may perform coordinate inverse transformation (2920). The coordinate inverse transformer may perform the inverse coordinate transformation operation based on the selected coordinate system. The coordinate inverse transformation operation corresponds to the reverse of the coordinate transformation operation described with reference to FIG. 23. The coordinate system according to the embodiments may include, but is not limited to, an orthogonal coordinate system, a cylindrical coordinate system, and a spherical coordinate system. According to embodiments, the coordinate inverse transformation may include, but is not limited to, orthogonal-cylindrical coordinate inverse transformation, which is the reverse of the orthogonal-cylindrical coordinate transformation described with reference to FIG. 24A, orthogonal-spherical coordinate inverse transformation, which is the reverse of the orthogonal-spherical coordinate transformation described with reference to FIG. 24B, cylindrical-orthogonal coordinate inverse transformation, which is the reverse of the cylindrical-orthogonal coordinate transformation described with reference to FIG. 24C, and spherical-orthogonal coordinate inverse transformation, which is the reverse of spherical-orthogonal coordinate transformation described with reference to FIG. 24D.

FIGS. 30A to 30D show examples of equations representing inverse coordinate transformation.

FIG. 30A show equations representing orthogonal-cylindrical coordinate inverse transformation. The equations of FIG. 30A represent the operation of inverse transformation of the cylindrical coordinate system into the orthogonal coordinate system performed by the coordinate inverse transformer (e.g., the coordinate inverse transformer 2870) in the case where the coordinate transformer according to the embodiments (e.g., the coordinate transformer 1910) transforms the orthogonal coordinate system into the cylindrical coordinate system. Accordingly, the equations of FIG. 30A represent the inverse of the equations of FIG. 24A. The equations represent the relationship between the parameters of the cylindrical coordinate system described with reference to FIG. 21 and the parameters of the orthogonal coordinate system described with reference to FIG. 20. Specifically, the equations indicate that any parameter of the orthogonal coordinate system can be represented with one or more parameters of the cylindrical coordinate system (e.g., $x = r \cos \theta$).

FIG. 30B show equations representing orthogonal-spherical coordinate inverse transformation. The equations of FIG. 30B represent the operation of inverse transformation of the spherical coordinate system into the orthogonal coordinate system performed by the coordinate inverse transformer (e.g., the coordinate inverse transformer 2870) in the case where the coordinate transformer according to the embodiments (e.g., the coordinate transformer 1910) transforms the orthogonal coordinate system into the spherical coordinate system. Accordingly, the equations of FIG. 30B represent the inverse of the equations of FIG. 24B. The equations represent the relationship between the parameters of the spherical coordinate system described with reference to FIG. 22 and the parameters of the orthogonal coordinate system described with reference to FIG. 20. Specifically, the equations indicate that any parameter of the spherical coordinate system can be represented with one or more parameters of the orthogonal coordinate system (e.g., $z = \rho \sin \theta$).

FIG. 30C show equations representing cylindrical-orthogonal coordinate inverse transformation. The equations of FIG. 30C represent the operation of inverse transformation of the orthogonal coordinate system into the cylindrical coordinate system performed by the coordinate inverse transformer (e.g., the coordinate inverse transformer 2870) in the case where the coordinate transformer according to the embodiments (e.g., the coordinate transformer 1910) transforms the cylindrical coordinate system into the orthogonal coordinate system. Accordingly, the equations of FIG. 30C represent the inverse of the equations of FIG. 24C. The equations represent the relationship between the parameters of the orthogonal coordinate system described with reference to FIG. 20 and the parameters of the cylindrical coordinate system described with reference to FIG. 21. Specifically, the equations indicate that any parameter of the cylindrical coordinate system can be represented with one or more parameters of the orthogonal coordinate system (e.g., $r = \sqrt{x^2 + y^2}$).

FIG. 30D show equations representing spherical-orthogonal coordinate inverse transformation. The equations of FIG. 30D represent the operation of inverse transformation of the orthogonal coordinate system into the spherical coordinate system performed by the coordinate inverse transformer (e.g., the coordinate inverse transformer 2870) in the case where the coordinate transformer according to the embodiments (e.g., the coordinate transformer 1910) transforms the spherical coordinate system into the orthogonal coordinate system. Accordingly, the equations of FIG. 30D represent the inverse of the equations of FIG. 24D. The equations represent the relationship between the parameters of the spherical coordinate system described with reference to FIG. 22 and the parameters of the orthogonal coordinate system described with reference to FIG. 20. Specifically, the equations indicate that any parameter of the spherical coordinate system can be represented with one or more parameters of the orthogonal coordinate system (e.g., $\rho = \sqrt{x^2 + y^2 + z^2}$).

Figure 31:
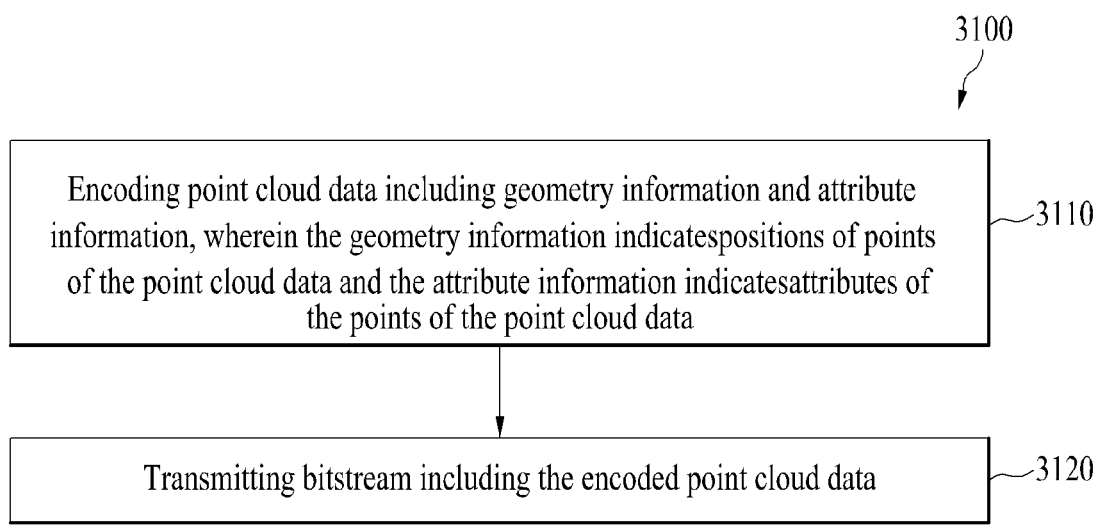
FIG. 31 is a flow diagram illustrating a process of processing point cloud data according to embodiments.

FIG. 31 is a flow diagram illustrating a process of processing point cloud data according to embodiments.

The point cloud data processing device described with reference to FIGS. 1 to 30 (e.g., the point cloud data transmission device described with reference to FIGS. 1, 11, 14, 15, 18, and 19) may perform the encoding operation described with reference to FIGS. 1 to 30. A point cloud encoder (e.g., the point cloud encoder described with reference to FIGS. 1, 4, 11, 14, 15, and 18) included in the point cloud data processing device according to the embodiments may encode point cloud data containing geometry information and attribute information. As described with reference to FIGS. 1 to 30, the geometry information indicates positions of points of the point cloud data, and the attribute information indicates attributes of the points of the point cloud data. As described with reference to FIGS. 1 to 30, the point cloud encoder may include a geometry information encoder configured to encode the geometry information (e.g., the geometry information encoder 1820 described with reference to FIG. 18, the geometry information encoder 1900 described with reference to FIG. 19, etc.) and an attribute information encoder configured to encode the attribute information (e.g., the attribute information encoder 1830, etc.). The geometry information encoder according to the embodiments may further include a coordinate transformer (e.g., the coordinate transformer 1910 of FIG. 19) configured to perform coordinate transformation to transform a first coordinate system into a second coordinate system, the first coordinate system being used to represent the positions of the points of the point cloud data indicated by the geometry information with positions in a three-dimensional space for a part or the entirety of the geometry information. According to embodiments, when the distance between the origin of a first coordinate system and the positions of one or more points presented in the first coordinate system is greater than a preset value, the coordinate transformer may select a second coordinate system for coordinate transformation, and transform the first coordinate system used to represent the positions of the one or more points whose distance to the origin of the first coordinate system is greater than the preset value into the selected second coordinate system. The first coordinate system and the second coordinate system according to the embodiments may correspond to one or more coordinate systems of the embodiments described with reference to FIGS. 20 to 22. Also, the coordinate transformer according to the embodiments may perform the coordinate transformation operation (or coordinate transformation) described with reference to FIGS. 24A to 24D. The geometry information encoder according to the embodiments may perform the one or more operations described with reference to FIGS. 1 to 30. Description of the one or more operations described with reference to FIGS. 1 to 30 will be skipped.

The point cloud data processing device according to the embodiments (or the transmitter of FIG. 1, etc.) may transmit a bitstream including the encoded point cloud data. The bitstream according to the embodiments may include a part or the entirety of the information included in the bitstream described with reference to FIG. 25. In addition, the bitstream according to the embodiments may include information related to coordinate transformation (e.g., information related to the coordinate transformation described with reference to FIG. 26).

According to embodiments, the information related to the coordinate transformation may include first information indicating whether the coordinate transformation is applied (e.g., transform_flag in FIG. 26), second information indicating the type of the first coordinate system (e.g., src_coordinate_type in FIG. 26), third information indicating the type of the second coordinate system (e.g., dest_coordinate_type in FIG. 26), and fourth information indicating the type of the coordinate transformation (e.g., transform_type in FIG. 26). The first coordinate system and the second coordinate system according to the embodiments are different from each other.

Figure 32:
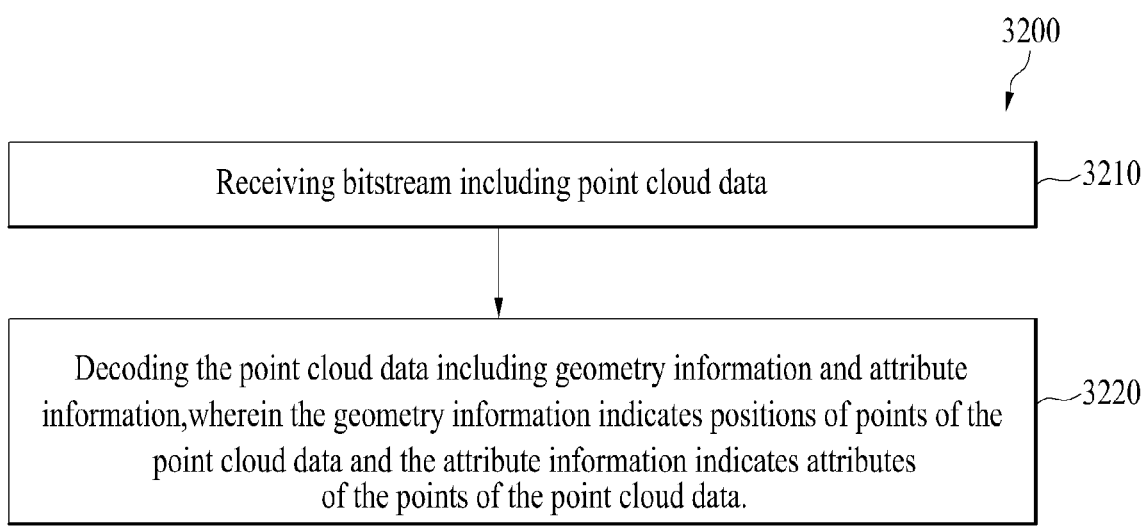
FIG. 32 is a flow diagram illustrating a process of processing point cloud data according to embodiments.

FIG. 32 is a flow diagram illustrating a process of processing point cloud data according to embodiments.

A point cloud data processing device according to embodiments (e.g., the point cloud data receiver described with reference to FIGS. 1, 13, 14, 16, 27, and 28) may receive a bitstream including point cloud data (3210). The bitstream according to the embodiments may include a part or the entirety of the information included in the bitstream described with reference to FIG. 25.

A point cloud decoder (e.g., the point cloud decoder described with reference to FIGS. 1, 13, 14, 16, 27, and 28) included in the point cloud data processing device according to the embodiments may decode the point cloud data containing geometry information and attribute information (3220). As described above with reference to FIGS. 1 to 30, the geometry information indicates positions of points of the point cloud data, and the attribute information indicates attributes of the points of the point cloud data.

The point cloud decoder according to the embodiments may include a geometry information decoder (e.g., the geometry information decoder 2720 described with reference to FIG. 27, the geometry information decoder 2800 described with reference to FIG. 28, etc.) configured to decode a geometry bitstream including geometry information and an attribute information decoder (e.g., the attribute information decoder (or attribute information decoding unit or attribute decoder) 2730 described with reference to FIG. 27) configured to decode an attribute bitstream including attribute information. The bitstream according to the embodiments may include information related to coordinate transformation (e.g., the information related to coordinate transformation of FIG. 26). Also, as described above with reference to FIGS. 27 and 28, when the information related to the coordinate transformation is not present in the bitstream, the geometry information decoder may derive information related to the coordinate transformation from the received data. The geometry information decoder according to the embodiments may further include a coordinate inverse transformer (e.g., the coordinate inverse transformer 2870 of FIG. 28) configured to performs coordinate inverse transformation on the geometry information based on the information related to the coordinate transformation. In order to transform a first coordinate system used to represent positions of points of the point cloud data indicated by the geometry information as positions in a three-dimensional space for a part or the entirety of the geometry information, the coordinate inverse transformer according to the embodiments may select a second coordinate system, and transform the part or entirety of the geometry information into information of the selected second coordinate system. In addition, the coordinate inverse transformer according to the embodiments may perform the coordinate inverse transformation operation (or coordinate inverse transformation) described with reference to FIGS. 30A to 30D. The geometry information decoder according to the embodiments may perform the one or more operations described with reference to FIGS. 1 to 30. Description of the one or more operations described with reference to FIGS. 1 to 30 will be skipped. The bitstream according to the embodiments may include information related to coordinate transformation (e.g., the information related to coordinate transformation described with reference to FIG. 26).

According to embodiments, the information related to the coordinate transformation may include first information indicating whether the coordinate transformation is applied (e.g., transform_flag in FIG. 26), second information indicating the type of the first coordinate system (e.g., src_coordinate_type in FIG. 26), third information indicating the type of the second coordinate system (e.g., dest_coordinate_type in FIG. 26), and fourth information indicating the type of the coordinate transformation (e.g., transform_type in FIG. 26). The first coordinate system and the second coordinate system according to the embodiments are different from each other.

Components of the point cloud data processing devices according to the embodiments described with reference to FIGS. 1 to 32 may be implemented as hardware, software, firmware, or a combination thereof including one or more processors coupled with a memory. The components of the devices according to the embodiments may be implemented as a single chip, for example, a single hardware circuit. Alternatively, the components of the point cloud data processing devices according to the embodiments may be implemented as separate chips. In addition, at least one of the components of the point cloud data processing devices according to the embodiments may include one or more processors capable of executing one or more programs, wherein the one or more programs may include are instructions that execute or are configured to execute one or more of the operations/methods of the point cloud data processing devices described with reference to FIGS. 1 to 32.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Descriptions of methods and devices may be applied so as to complement each other. For example, the point cloud data transmission method according to the embodiments may be carried out by the point cloud data transmission device or components included in the point cloud data transmission device according to the embodiments. Also, the point cloud data reception method according to the embodiments may be carried out by the point cloud data reception device or components included in the point cloud data reception device according to the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Mode for Disclosure

As described above, related contents have been described in the best mode for carrying out the embodiments.

INDUSTRIAL APPLICABILITY

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method of encoding point cloud data by an apparatus, the method comprising:
acquiring point cloud data;
encoding geometry information of the point cloud data by predicting the geometry information,
encoding attribute information of the point cloud data,
wherein the geometry information indicates positions of points of the point cloud data and the attribute information includes at least one of color and reflectance of the points of the point cloud data; and
transmitting a bitstream including the encoded point cloud data,
wherein the encoding includes transforming a coordinate of the geometry information based on transform type information,
wherein the transform type information includes at least one of orthogonal-cylindrical coordinate transformation, orthogonal-spherical coordinate transformation, cylindrical-orthogonal coordinate transformation, or spherical-orthogonal coordinate transformation.

2. The method of claim 1,
wherein the coordinate of the geometry information is transformed:
based on a distance between an origin of a first coordinate system and positions of one or more points represented in the first coordinate system being greater than a preset value, selecting a second coordinate system for the coordinate transformation; and
transforming the first coordinate system used to represent the positions of the one or more points whose distance to the origin of the first coordinate system is greater than the preset value into the selected second coordinate system.

3. The method of claim 1, wherein the bitstream further includes:
first information indicating whether the coordinate transformation a coordinate of the geometry information is transformed;
second information indicating a type of a first coordinate system;
third information indicating a type of a second coordinate system; and
fourth information indicating a type of coordinate transformation of the geometry information,
wherein the first coordinate system and the second coordinate system are different from each other.

4. An apparatus for encoding point cloud data, the apparatus comprising:

a memory; and a processor configured to execute one or more instructions in the memory which cause the processor to perform:

acquiring point cloud data;

encoding geometry information of the point cloud data by predicting the geometry information, encoding attribute information of the point cloud data, wherein the geometry information indicates positions of points of the point cloud data and the attribute information includes at least one of color and reflectance of the points of the point cloud data; and transmitting a bitstream including the encoded point cloud data;

wherein the encoding includes transforming a coordinate of the geometry information based on transform type information, wherein the transform type information includes at least one of orthogonal-cylindrical coordinate transformation, orthogonal-spherical coordinate transformation, cylindrical-orthogonal coordinate transformation, or spherical-orthogonal coordinate transformation.

5. The apparatus of claim 4, wherein the transforming the coordinate of the geometry information includes:

transforming a coordinate for a part or entirety of the point cloud data based on a distance between an origin of a first coordinate system and positions of one or more points represented in the first coordinate system being greater than a preset value; select a second coordinate system for the coordinate transformation; and transforming the first coordinate system used to represent the positions of the one or more points whose distance to the origin of the first coordinate system is greater than the preset value into the selected second coordinate system.

6. The apparatus of claim 4, wherein the bitstream further includes:

first information indicating whether a coordinate of the geometry information is transformed;

second information indicating a type of a first coordinate system;

third information indicating a type of a second coordinate system; and fourth information indicating a type of coordinate transformation of the geometry information, wherein the first coordinate system and the second coordinate system are different from each other.

7. A method of decoding point cloud data by an apparatus, the method comprising:

receiving a bitstream including point cloud data; and decoding geometry information of the point cloud data by predicting the geometry information, decoding attribute information of the point cloud data, wherein the geometry information indicates positions of points of the point cloud data and the attribute information includes at least one of color and reflectance of the points of the point cloud data, wherein the bitstream includes transform type information including at least one of orthogonal-cylindrical coordinate transformation, orthogonal-spherical coordinate transformation, cylindrical-orthogonal coordinate transformation, or spherical-orthogonal coordinate transformation.

8. The method of claim 7, wherein a coordinate of the geometry information is inversely transformed based on the information related to coordinate transformation of the geometry information for a part or entirety of the point cloud data.

9. The method of claim 7, wherein the information related to the coordinate transformation of the geometry information comprises:

first information indicating whether the coordinate transformation has been applied;

second information indicating a type of a first coordinate system;

third information indicating a type of a second coordinate system; and fourth information indicating a type of coordinate transformation, wherein the first coordinate system and the second coordinate system are different from each other.

10. An apparatus for decoding point cloud data, the apparatus comprising:

a memory; and a processor configured to execute one or more instructions in the memory which cause the processor perform:

receiving a bitstream including point cloud data; and decoding geometry information of the point cloud data by predicting the geometry information, decoding attribute information of the point cloud data, wherein the geometry information indicates positions of points of the point cloud data and the attribute information includes at least one of color and reflectance of the points of the point cloud data, wherein the bitstream includes transform type information including at least one of orthogonal-cylindrical coordinate transformation, orthogonal-spherical coordinate transformation, cylindrical-orthogonal coordinate transformation, or spherical-orthogonal coordinate transformation.

11. The apparatus of claim 10, wherein the information related to the angular coordinate comprises:

first information indicating whether a coordinate of the geometry information is transformed has been applied;

second information indicating a type of a first coordinate system;

third information indicating a type of a second coordinate system; and fourth information indicating a type of coordinate transformation of the geometry information, wherein the first coordinate system and the second coordinate system are different from each other.

\* \* \* \* \*